United States Patent
Tokuda et al.

(10) Patent No.: US 7,753,221 B2
(45) Date of Patent: Jul. 13, 2010

(54) BLOW-MOLDED CONTAINER AND MOLD FOR USE IN BLOW MOLDING

(75) Inventors: Hiroaki Tokuda, Tokyo (JP); Kazuhisa Innami, Nasu-gun (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 1391 days.

(21) Appl. No.: 10/528,660

(22) PCT Filed: Oct. 29, 2003

(86) PCT No.: PCT/JP03/13822

§ 371 (c)(1),
(2), (4) Date: May 26, 2005

(87) PCT Pub. No.: WO2004/039560

PCT Pub. Date: May 13, 2004

(65) Prior Publication Data

US 2005/0199577 A1    Sep. 15, 2005

(30) Foreign Application Priority Data

Oct. 31, 2002  (JP) ............................. 2002-317627
Oct. 31, 2002  (JP) ............................. 2002-317628

(51) Int. Cl.
B65D 1/40      (2006.01)
B29C 49/04     (2006.01)
B29C 49/50     (2006.01)

(52) U.S. Cl. .................... 215/373; 220/606; 425/531

(58) Field of Classification Search ................ 215/371, 215/373; 220/608, 623, 666; 425/531, 532
See application file for complete search history.

(56) References Cited

U.S. PATENT DOCUMENTS 3,399,424 A * 9/1968 Sheptak et al. .............. 425/156

(Continued)

FOREIGN PATENT DOCUMENTS

JP        U-57-172708        10/1982

(Continued)

OTHER PUBLICATIONS

International Search Report mailed Jan. 27, 2004 for Application No. PCT/JP03/13822 (with translation).

*Primary Examiner*—Sue A Weaver
(74) *Attorney, Agent, or Firm*—Oliff & Berridge PLC

(57) ABSTRACT

A blow-molded container is provided, which has a low blow ratio and good appearances with no flash line, glossy spot, and/or color spot on the sidewall of the container near the bottom. The mold created for this purpose is used in blow molding and is characterized in that a split mold has a mold parting face perpendicular to the mold-clamping direction, splits into front and rear mold halves, and has a mold pinch-off section, which is used to pinch off parison P and is provided with pinch-off blades on bottom surface of mold cavity bottom. In the cross-sectional plan view of said split mold in its closed state, a bottom parting line is formed by a linear pinch-off line, which is formed on the bottom surface by the pinch-off blades, a pair of mold parting lines formed by said mold parting face on the right and left peripheries, and a pair of connecting lines that connects the right and left ends of said pinch-off line with the inner ends of said right and left mold parting lines. The all or those portions of said connecting lines that lie adjacent to said pinch-off line are formed by end parting faces located at right and left ends of the pinch-off section of said split mold so that a pair of roughly right-angled bent corners is formed by all or those adjacent portions of said connecting lines and said pinch-off line.

11 Claims, 27 Drawing Sheets

U.S. PATENT DOCUMENTS

| | | | | |
|---|---|---|---|---|
| 3,417,892 A | * | 12/1968 | Schweiger | 215/371 |
| 3,817,676 A | * | 6/1974 | Seefluth | 425/531 |
| 3,833,700 A | * | 9/1974 | Adomaitis | 264/531 |
| 3,865,531 A | * | 2/1975 | Moore et al. | 425/525 |
| 3,942,932 A | * | 3/1976 | Gilbert | 425/529 |
| 5,080,260 A | * | 1/1992 | During | 222/107 |
| 5,316,184 A | * | 5/1994 | During | 222/107 |
| 6,290,345 B1 | * | 9/2001 | Sasaki et al. | 347/86 |

FOREIGN PATENT DOCUMENTS

| | | |
|---|---|---|
| JP | A-7-88943 | 4/1995 |
| JP | B2-7-75848 | 8/1995 |
| JP | A-9-262902 | 10/1997 |
| JP | A-2004-1314 | 1/2004 |
| WO | WO 02/053341 A1 | 7/2002 |

* cited by examiner

Fig. 6
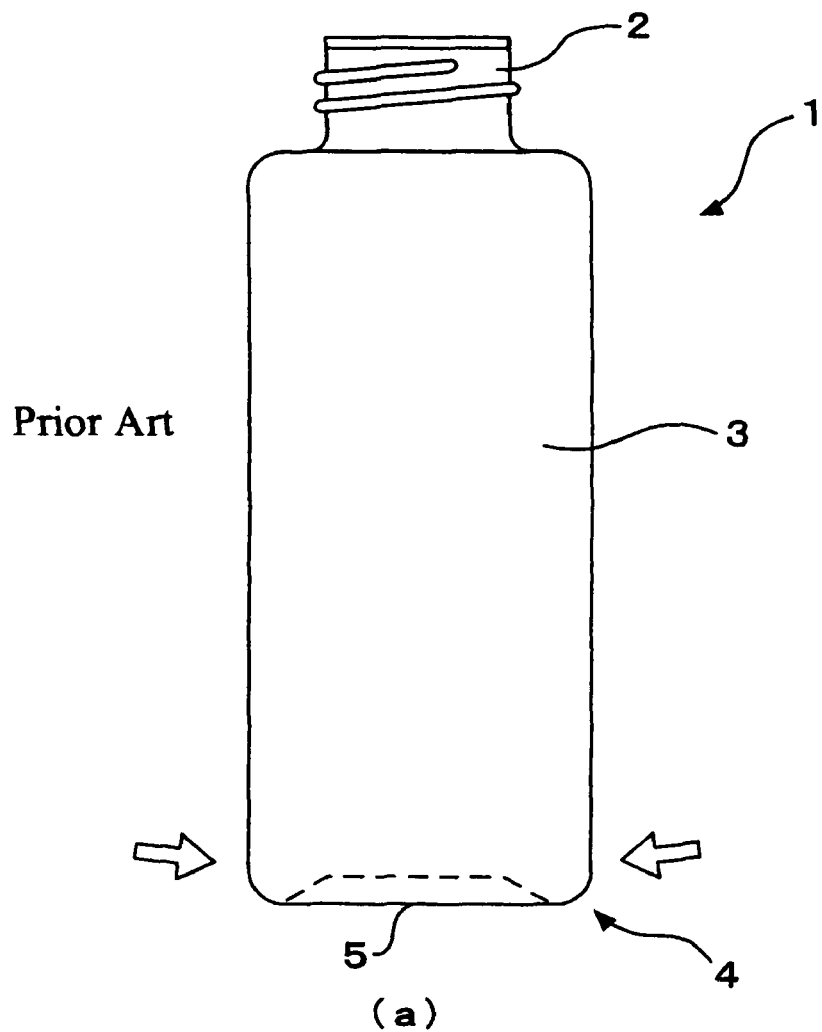
(a)
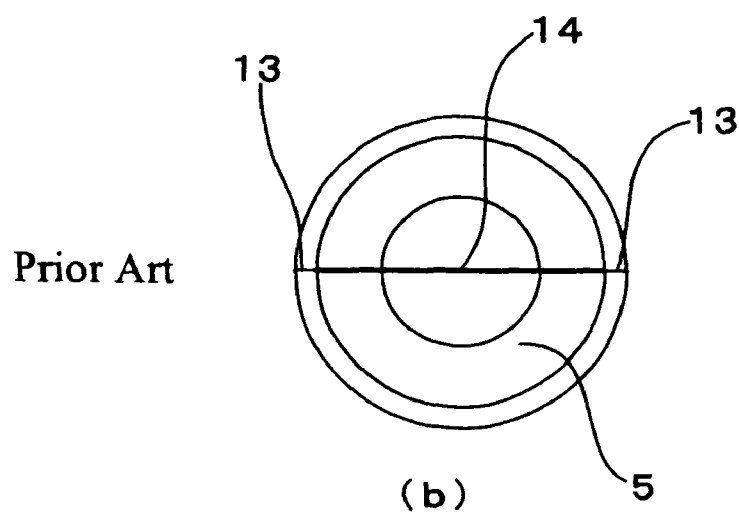
(b)

Prior Art

Fig. 15
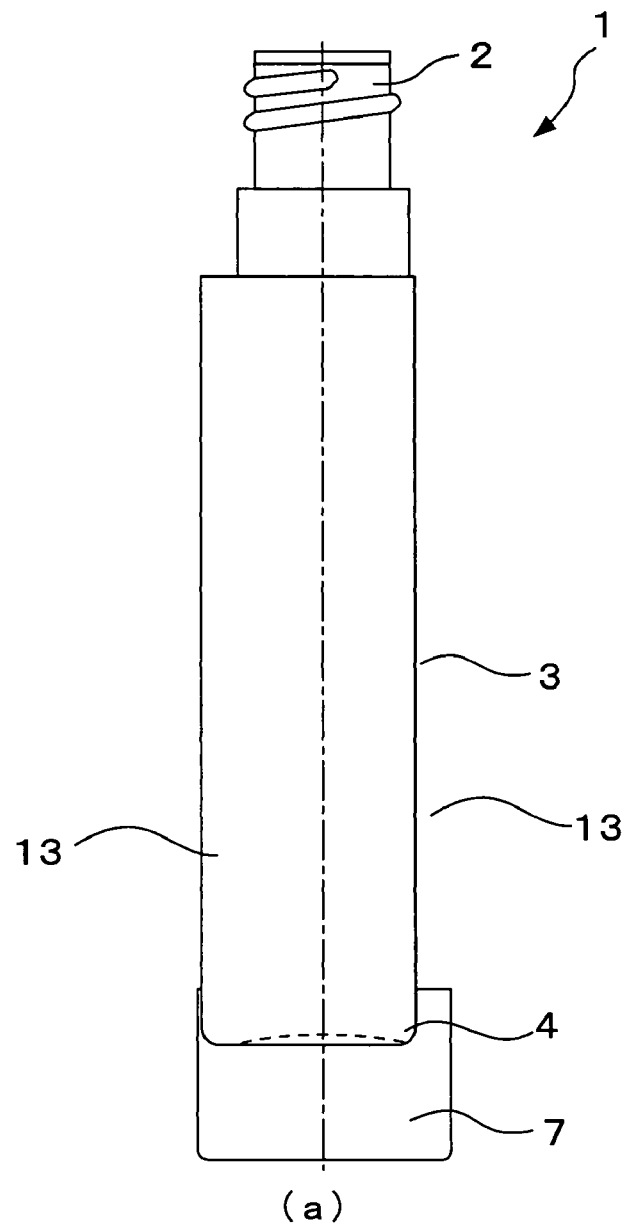
(a)
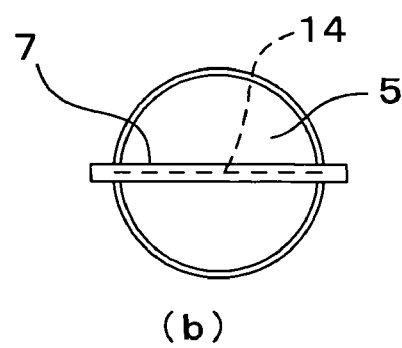
(b)

Fig. 16
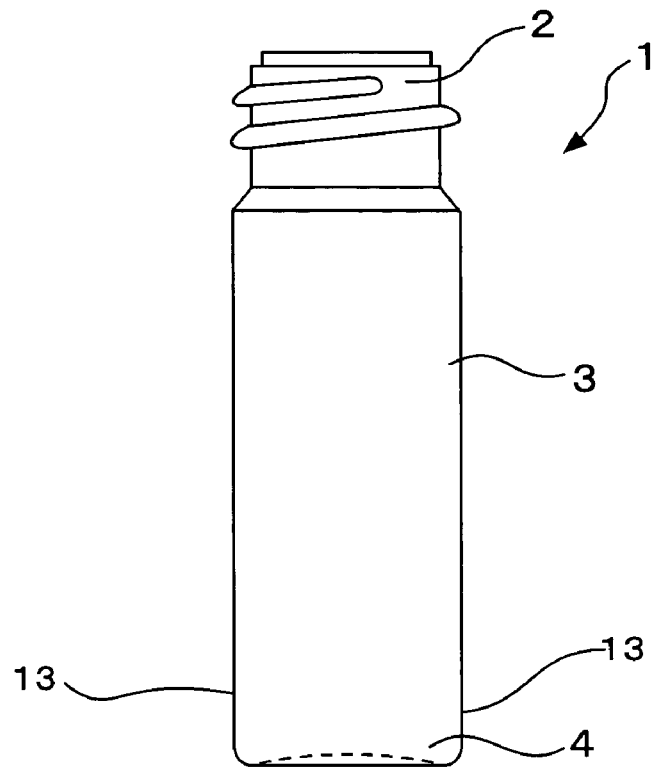
(a)
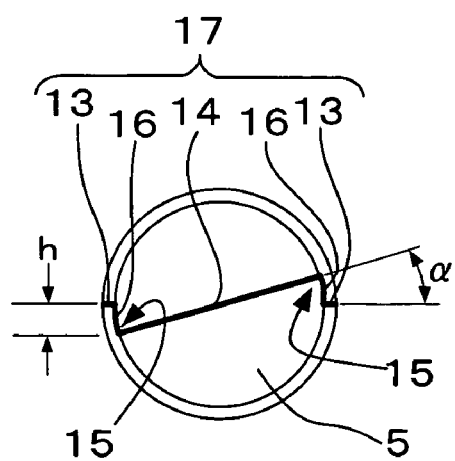
(b)

Fig. 17
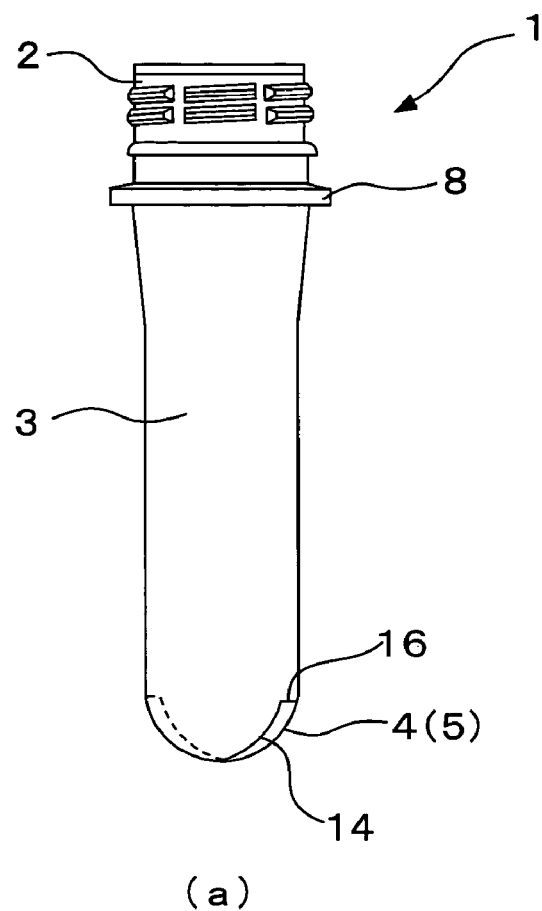
(a)
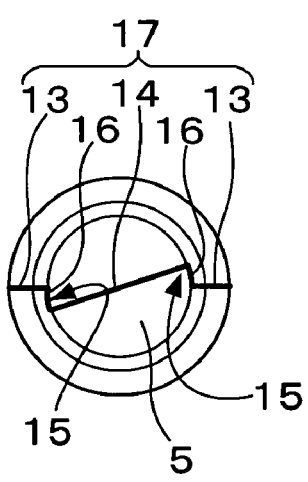
(b)

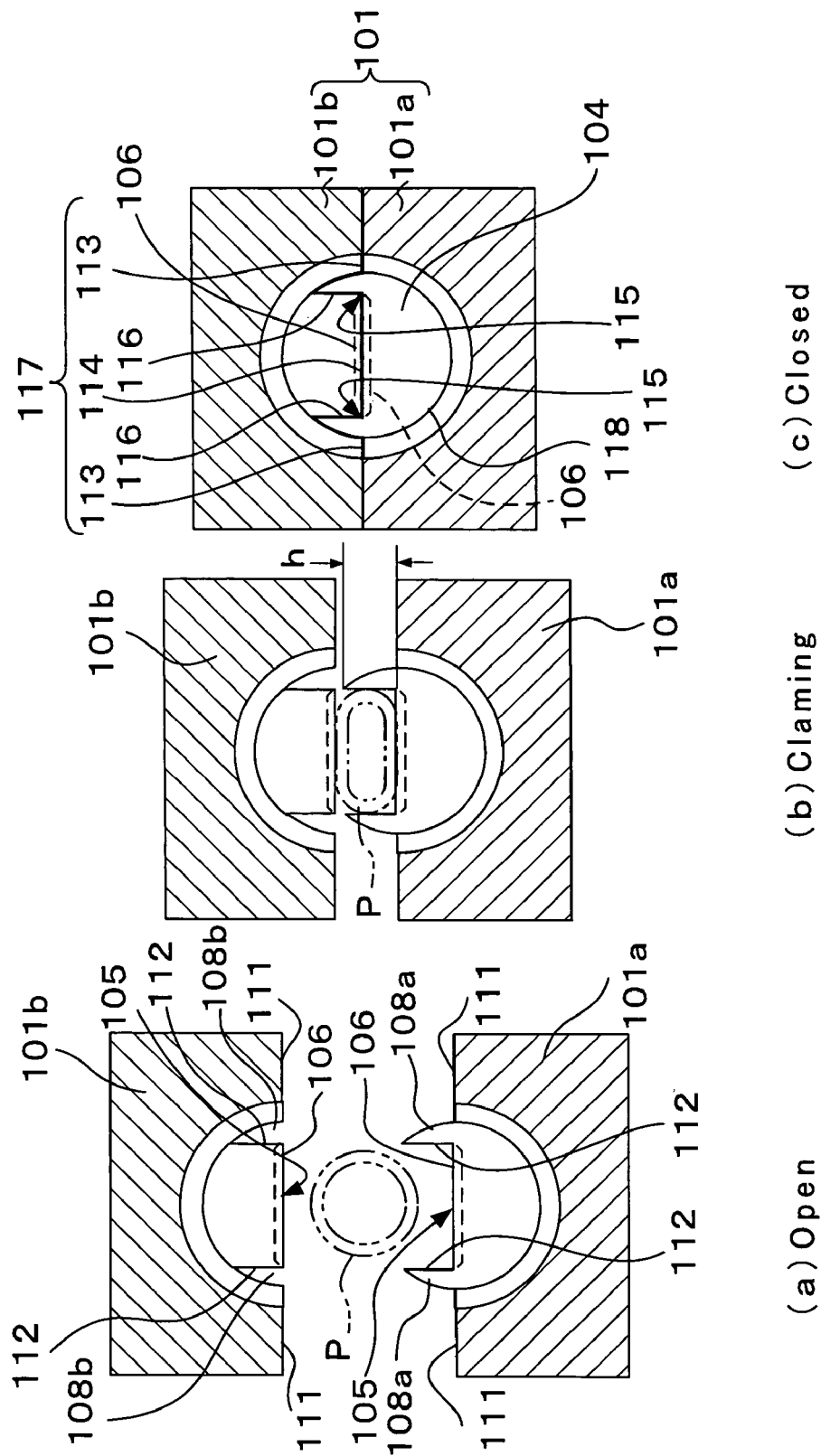

BLOW-MOLDED CONTAINER AND MOLD FOR USE IN BLOW MOLDING

BACKGROUND

1. Technical Field

This invention relates to a blow-molded container and, in particular, to a container having a small blow ratio and molded by a direct blow molding process.

This invention also relates to a mold for use in blow molding, and in particular, to a mold for use in blow molding in which flash development is controllable at the bottom pinch-off portion of the containers, such as bottles.

2. Background Art

As shown in FIG. 20, an extruder 121 is used in an ordinary direct blow molding process to extrude parison P, which is a molten resin in a cylindrical shape. This parison P is then put between separated two halves of a split mold 101 to be used in blow molding, and is pinched in the mold clamping process. A pair of pinch-off blades is disposed at the bottom pinch-off section 105 of the cavity 102 in the lower portion of the split mold 101 and is used to cut off the parison at its lower end. The cut end of the parison is sealed in situ by thermal welding. A parison cutter 122 cuts the upper portion of the cylindrical molten resin to form a parison P in the bottomed cylindrical shape. Then, an air nozzle is inserted into the parison P from the head above the split mold 101 to blow air into the parison P and to blow-mold it into a molded product.

FIG. 6 shows an example of a conventional blow-molded container. FIGS. 7 and 8 show the rear half of a conventional split mold and a conventional mold-clamping and pinch-off process, respectively. In its structure, the split mold 101 has front and rear halves that have been parted on one plane (mold parting face 111). FIG. 8(c) shows a cross-sectional plan view of the split mold 101 in the closed state. As shown, the pinch-off line 114 is formed by the pinch-off blades 106 on the bottom surface 104 of the bottom 103 of the mold cavity 102, and is also located along the mold parting line 113, which is formed by the mold parting face 111.

The length of the pinch-off section 105, i.e., the lateral length of the pinch-off blades 106, is about 1.6 Dp, which is the width of the parison measured when the parison with an outer diameter of 1 Dp is pressed flat. As a result, the pinch-off line 14 with a length of about 1.6 Dp is formed on the same line as the mold parting line 13 on the underside surface of the molded container. (See FIG. 6.)

Conventionally, various improvements have been made for the structure of the container near the bottom pinch-off portion to increase the strength of the bottom seal of the molded container and from the point of view of outer appearances. Japanese Application No. 1995-88943, for example, describes a method of increasing the strength of bottom seal of, above all, a laminated container, by forming uneven pushing dents on both sides of the container pinch-off portion. Japanese Application No. 1997-262902 describes a method of controlling bottom seal thickness by disposing a compression plate at a position below the pinch-off section of a molding tool and allowing the compression plate to pinch the resin that runs off from the pinch-off section (hereinafter referred to as flash).

As described above, a pinch-off line 1.6 Dp in length is usually formed on the underside surface of the container, which is a direct blow-molded product. Because the pinch-off line thus formed does not exceed the periphery of the underside surface in the case of a container having a sufficiently large blow ratio, the containers are utilized in various applications with no problem of outer appearances. However, when the container having a small blow ratio is blow-molded, the container pinch-off portion would have a length close to or equal to the diameter of the bottom surface of the mold cavity. During the pinch-off process, the parison is pressed flat at the bottom of the mold cavity. At that time, the parison deforms laterally, or the parison resin flows laterally from the right and left sides of the mold pinch-off section toward the mold parting face located to the right and left. As a result, the resin that has run off remains not only on the underside bottom of the container, but also in the vicinity of the mold parting lines on the sidewall of the body right above the bottom. Thus, the so-called flash is formed, and the flash lines remain on the container product.

The length of the container pinch-off portion can be made smaller than the diameter of the underside surface of the container if the container has a blow ratio close to 2. Even in that case, it happens that, once the parison has been pinched and pressed flat by the mold pinch-off section, the resin may flow from the right and left sides of the pinch-off section laterally along the mold parting face. Such flows of the resin leave flash lines nearby the mold parting lines on the body wall right above the bottom surface of the molded container. Even if there has been no flash line, there still would remain a glossy spot or a color spot, including a drawing spot, an orientation spot, and/or a cooling spot, which are the factors caused by the changes in the resin flow.

Furthermore, if it is necessary to thicken the parison wall, those glossy or color spots as described above would develop even at a blow ratio close to 3.

Many small containers having a blow ratio of 1.6 or less are used in the field of bottles for cosmetic materials, such as mascara, eye liners, etc., and this field is where the outer appearances of the container are important factors affecting marketability of products. However, in the case of a container with a small blow ratio, the available length of the container pinch-off portion is up to the diameter of the mold cavity at the maximum. Thus, the pinch-off section can have a length less than 1.6 Dp, which is the width of the parison that has been pressed flat. In that case, the parison is pressed not only at the mold pinch-off section, but also on the mold parting face nearby the pinch-off section. The flash lines inevitably develop in the vicinity of the mold parting lines on both sides of the body right above the bottom.

These flash line, glossy spot, color spot, and the like are a large disfiguring problem concerned with the marketability of products especially in the case of cosmetic containers. Up to now, any solution has never been proposed to solve this problem. Even if post-treatment is used to improve outer appearances of the containers, it takes a long time of processing.

This invention has been made to solve the above-described technical problem found in conventional art. The technical problem of this invention is to inhibit the flash development on the underside bottom surface of the container molded by the direct blow method, especially in the lateral direction from the right and left ends of the mold pinch-off section. An object of this invention is to provide a blow-molded container having a low blow ratio and good appearances with no flash line, glossy spot, and/or color spot on the sidewall of the container near the bottom.

Another object of this invention is to create a mold for use in blow molding, which can provide a blow-molded container having a low blow ratio and good appearances with no flash line, glossy spot, and/or color spot on the sidewall of the container near the bottom.

SUMMARY

Among the Claims of this invention to solve the above-described technical problem, the means of the invention relate to a blow-molded container. The means of carrying out one of the embodiments exists in the configuration that a blow-molded container comprises a cylindrical body, a neck disposed in the upper portion of said body, and a bottom disposed in the lower portion of said body, and is obtained by a direct blow molding process utilizing a split mold, which has a mold parting face perpendicular to the mold-clamping direction and splits into front and rear mold halves, and in which a blow ratio in the range of 1 to 3 is set in the direction of mold parting lines formed by said mold parting face in a plan view showing a body portion right above said bottom, wherein a bottom parting line is formed on underside surface of said bottom by a linear pinch-off line, which is formed by pinch-off blades disposed at the pinch-off section of said split mold, a pair of said mold parting lines formed on the right and left sides of a peripheral zone, and a pair of connecting lines that connects the right and left ends of said pinch-off line to the inner ends of said right and left mold parting lines, wherein all or those portions of said connecting lines that lie adjacent to said pinch-off line are formed by end parting faces located at right and left ends of the pinch-off section of said split mold so that a pair of roughly right-angled bent corners is formed by all or those adjacent portions of said connecting lines and said pinch-off line, and wherein said split mold permits flash lines to develop on the underside surface of said bottom but to extend only from the center of the underside bottom surface to said bent corners.

Under the above-described configuration, a linear pinch-off line is formed in the center of the underside bottom surface of the container by the pinch-off blades disposed at the bottom pinch-off section of the split mold. A pair of the mold parting lines, perpendicular to the mold-clamping direction of the split mold, is formed on the right and left sides of the peripheral zone. Connecting lines are connected to both of the pinch-off line and these mold parting lines, so that a bottom parting line is formed on the underside bottom surface.

The all or those portions of said connecting lines that lie adjacent to said pinch-off line are formed by end parting faces located at right and left ends of the pinch-off section of said split mold so that a pair of roughly right-angled bent corners is formed by all or those adjacent portions of said connecting lines and said pinch-off line.

Under this configuration, the bent corners are inserted between the pinch-off line and the mold parting lines, both of which would be straight from right to left in the case of conventional containers.

Such a container is blow-molded in a split mold in which the portion of the mold under the bottom surface comprises at least mold parting faces, the mold pinch-off section, and the end parting faces located at both ends of the pinch-off section and roughly perpendicular to the lateral direction of the pinch-off section, all of which are exposed by the splitting of the mold into the front and rear halves. The end parting faces carry out a function of controlling lateral deformation from the right and left ends of the pinch-off section during the change in parison from a cylindrical shape to a flat shape at the pinch-off section. The end parting faces have also another function as the barrier faces to stop the flow of resin in the lateral direction, which is caused by the pinch-off blades that push the flattened resin. Thus, these end parting faces prevent excessive parison deformation and resin flow over the mold parting faces.

Due to the action and effect of the above-described bent corners or end parting faces, it has become possible to restrict the range of flash from the center of bottom surface up to the bent corners, even though flash somehow develops in the vicinity of the container bottom when the split mold is clamped during the blow molding operation. Thus, a blow-molded container can be provided, which has no flash line, glossy spot, or color spot in the vicinity of the mold parting lines on the body wall right above the bottom.

It should be noted that any conventional blow-molded container would never have the problem of appearances and that the effect of this invention would become obscure, as long as the container has a blow ratio larger than 3, as measured in the direction of mold parting lines that are formed by the mold parting faces right above the bottom of the body. In the case of a container having a blow ratio less than 1, it would be difficult for the parison to be pinched stably by the split mold.

The means of carrying out another embodiment exists in the configuration that a blow ratio larger than 1.6 is set.

If the blow ratio is larger than 1.6, the cylindrical parison turns to a flat folded shape at the mold pinch-off section, and the flattened parison is further pressed and cut by the pinch-off blades. Since the resin can be prevented from flowing in the lateral direction from both ends of the mold pinch-off section even though the flow is caused by the pinch-off blades that push the flattened resin, the flash can be restricted so as not to exceed the bent corners.

The means of carrying out another embodiment exists in the configuration that a blow ratio of 1.6 or less is set.

Since the deformation of the parison in the lateral direction is restricted at both ends of the mold pinch-off section, it is possible to press and flatten the parison to a width of 1.6 Dp or less. Thus, there can be obtained a container having a blow ratio of 1.6 or less and no flash line, glossy spot, or color spot in the vicinity of the mold parting lines on the body sidewall right above the bottom surface.

The means of carrying out another embodiment exists in the configuration that the bent corners have a step height or facial width at least nearly twice as much as the wall thickness of the parison (P) to be used for blow molding.

If the blow ratio exceeds roughly 1.6, the cylindrical parison is flattened first at the mold pinch-off section into a state in which the parison is pressed flat. At that time, the total thickness of the flat parison is nearly twice as much as the wall thickness of the parison. Then, the flattened parison is further pressed and cut by the pinch-off blades. Therefore, when the step height of the bent corners or the width of the end parting faces is set at a length equivalent to at least nearly twice as much as the parison wall thickness, it is possible to inhibit the resin flow in the lateral direction from the right and left ends of the mold pinch-off section even though the flow is caused by the pinch-off blades that push the flattened resin. Thus, the flash can be restricted so as not to exceed the bent corners.

At a blow ratio of about 1.6 or less, the step height or the facial width is set at a relatively high level because it is necessary to set the length of the container pinch-off portion at about 1.6 Dp or less and to control the lateral deformation of the parison. However, this step height or the facial width can be determined in response to the container shape, the blow ratio to be used, the parison diameter and thickness, etc.

The means of carrying out another embodiment exists in the configuration that the pinch-off line passing the center of the underside surface of the container bottom is disposed so as to form a given central angle with the direction of the mold parting lines, wherein the connecting lines are formed by connecting almost linearly the right and left ends of the pinch-off line to the inner ends of the respective right and left mold parting lines, and wherein the bottom parting line is formed almost axisymmetrically around the center of the underside bottom surface.

Under the configuration, the pinch-off line is formed by angling the line from the direction of the mold parting lines. Because of this gradient, there occurs a pair of steps, as seen in the bottom plan view, between the right and left ends of the pinch-off line and the inner ends of the right and left mold parting lines. A pair of connecting lines is used to connect between the respective ends to form the bent corners. It is possible to control the step height of the bent corners or the width of the end parting faces by this gradient or the central angle.

The above-described configuration enables the bottom parting line to be formed in a simple design. The parting faces in the portion under the bottom surface of the mold cavity can be formed in a simple shape. It becomes possible for the pinch-off line to be formed along the entire diameter of the underside bottom surface. A container with a lower blow ratio than usual can be provided easily.

The means of carrying out another embodiment exists in the configuration that the central angle is set at 45 degrees or less.

The upper limit to the central angle is set under the above configuration. If the central angle is too large or if the pinch-off line is too much inclined from the direction of the mold parting lines, the parison has to be pressed flat on a large slope during the pinch-off process of the blow molding operation. Because under such a condition, the pinch-off operation cannot be fulfilled smoothly, preferably a central angle of 45 degrees or less is used.

The step height of the bent corners or the width of the end parting faces is adjusted by the central angle as described above. The lower limit to this central angle can be determined geometrically from the necessary step height or facial width, the size of the molded container, and the thickness of the parison wall.

The means of carrying out another embodiment exists in the configuration that the pinch-off line passing the center of the underside surface of the container bottom has the same direction as that of the mold parting lines and that the bent corners are formed in roughly symmetrical positions at the right and left ends of this pinch-off line.

Under the above configurations, the parison is pressed flat by the mold pinch-off section on the face that is perpendicular to the direction in which the split mold is clamped. In that case, the pinch-off process can be achieved more stably, and a fully large step height or facial width can be used for the bent corners or the end parting faces, thus ensuring that the deformation of the parison can be controlled in the lateral direction.

The means of carrying out another embodiment exists in the configuration that the container is used as a primary molded product and is molded into a biaxially drawn, blow-molded container.

Under the above configuration, the direct blow-molded product is used as the primary molded product or the so-called preform, and can be molded into a biaxially drawn, blow-molded container. It makes no use of any core mold, need not consider the undercut property, and enables the preform to be molded in a shape not found in the injection-molded preform. The preform has various shapes, and provides a biaxially drawn, blow-molded container having uniform thickness and drawing ratio. If the parison is made of a multi-layer wall, it is possible to manufacture a biaxially drawn, blow-molded container of the laminated type easily.

The means of carrying out another embodiment exists in the configuration that wall of the container has a laminated structure.

If the parison wall has a laminated structure, there can be easily obtained a container that can effectively demonstrate desired physical properties and characteristics. Since the parison is a direct blow-molded product, the laminated structure can be formed easily.

The means of carrying out another embodiment exists in the configuration that the parison wall of a laminated structure comprises at least an outer layer made of a synthetic resin and an inner layer made of another synthetic resin that is less compatible with the synthetic resin of which the outer layer is made.

Under the above configuration, the molded container comprises a synthetic resin outer layer, which forms an outer envelope, and an inner layer of another synthetic resin, which forms an inner bag and is freely peelable from the outer layer. Such a container can be utilized as a delaminated container.

The means of the invention also relate to a mold for use in blow molding.

The means of carrying out another embodiment comprises:

a mold for use in blow molding characterized in that a split mold has a mold parting face perpendicular to the mold-clamping direction, splits into front and rear mold halves, and has a mold pinch-off section, which is used to pinch off parison and is provided with pinch-off blades on bottom surface of mold cavity, wherein a bottom parting line is formed, in the cross-sectional plan view of said split mold in its closed state, by a linear pinch-off line, which is formed on the bottom surface by the pinch-off blades, a pair of mold parting lines formed by said mold parting face on the right and left peripheries, and a pair of connecting lines that connects the right and left ends of said pinch-off line with the inner ends of said right and left mold parting lines, and wherein all or those portions of said connecting lines that lie adjacent to said pinch-off line are formed by end parting faces located at right and left ends of the pinch-off line of said split mold so that a pair of roughly right-angled bent corners is formed by all or those adjacent portions of said connecting lines.

Under the above-described configuration, a linear pinch-off line is formed in the center of the bottom surface of the mold cavity by the pinch-off blades disposed at the bottom pinch-off section of the split mold. A pair of the mold parting lines, perpendicular to the mold-clamping direction of the split mold, is formed on the right and left sides of the peripheral zone. Connecting lines are connected to both of the pinch-off line and the mold parting lines, so that a bottom parting line is formed on the bottom surface.

The all or those portions of said connecting lines that lie adjacent to said pinch-off line are formed by end parting faces located at right and left ends of the pinch-off line of said split mold so that a pair of roughly right-angled bent corners is formed by all or those adjacent portions of said connecting lines.

Under this configuration, the bent corners are inserted between the pinch-off line and the mold parting lines, both of which would be straight from right to left on the bottom surface of the conventional mold cavity.

These end parting faces are formed at both ends of the mold pinch-off section in positions almost perpendicular to the lateral direction of the pinch-off blades, and carry out a function of controlling lateral deformation from the right and left ends of the pinch-off section during the change in parison from a cylindrical shape to a flat shape at the mold pinch-off section. The end parting faces have also another function as the barrier faces to stop the flow of resin in the lateral direction, which is caused by the pinch-off blades that push the flattened resin. Thus, the end parting faces prevent excessive parison deformation and resin flow toward the mold parting faces.

Due to the action and effect of the above-described bent corners or end parting faces, it has become possible to restrict the range of flash development from the center of bottom surface of the mold cavity up to the bent corners when the split mold is clamped during the blow molding operation. Thus, a blow-molded container having a low blow ratio can be provided, which has good appearances and no flash line, glossy spot, or color spot in the vicinity of the mold parting lines on the body wall right above the bottom. This has been difficult with conventional molds.

In the structure of the mold, the faces performing the barrier function against parison deformation or resin flow is formed by changing the configuration of the parting faces in the portion under the bottom surface of the split mold cavity. This simply involves changing the parting faces in the portion under the bottom surface of an ordinary mold cavity. There is no need to add another component or movable portion. Thus, the mold can have equivalent productivity and durability as compared to ordinary molds for use in blow molding.

It is a matter of course that the split mold has such a shape that enables the mold halves to go forward and back smoothly in the mold-clamping or -opening operation.

The means of carrying out another embodiment exists in the configuration that the bent corners have has a step height or facial width at least nearly twice as much as the wall thickness of the parison to be used for blow molding.

At the blow ratio exceeding about 1.6 under said configuration, the cylindrical parison is flattened first at the mold pinch-off section into a state in which the flat walls of the parison are in contact with each other. At that time, the total thickness of the flat parison is nearly twice as much as the wall thickness of the parison. Then, the flattened parison is further pressed and cut by the pinch-off blades. Therefore, when the step height of the bent corners or the width of the end parting faces is set at a length equivalent to at least nearly twice as much as the parison wall thickness, it is possible to inhibit the resin flow in the lateral direction from the right and left ends of the mold pinch-off section even though the flow is caused by the pinch-off blades that push the flattened resin.

At a blow ratio of about 1.6 or less, the step height or the facial width is set at a relatively high level because it is necessary to set the length of the container pinch-off portion at about 1.6 Dp or less and to control the lateral deformation of the parison. However, this step height or the facial width can be determined in response to the container shape, the blow ratio to be used, the parison diameter and thickness, etc.

The means of carrying out another embodiment exists in the configurations that the pinch-off line passing the center of the bottom surface of the mold cavity, as shown in the cross-sectional plan view of the split mold in the closed state, is disposed so as to form a given central angle with the direction of the mold parting lines, that the connecting lines are formed by connecting almost linearly the right and left ends of the pinch-off line with the inner ends of the respective right and left mold parting lines, and that the bottom parting line is formed almost axisymmetrically around the center of the bottom surface.

Under the above configurations, the pinch-off line is formed by angling the line from the direction of the mold parting lines. Because of this gradient, there occurs a pair of steps, as seen in the bottom plan view, between the right and left ends of the pinch-off line and the inner ends of the right and left mold parting lines. A pair of connecting lines is used to connect between the respective ends to form the bent corners. It is possible to control the step height of the bent corners or the width of the end parting faces by this gradient or the central angle.

On the whole, the parting faces in the portion under the bottom surface of the mold cavity can be formed in a simple shape. It becomes possible for the length of the mold pinch-off section to be extended along the entire diameter of the bottom surface. The mold can be used for molding containers with an unusually low blow ratio. Because of high durability and simple flow passages of the resin that turns out to be flash, there remains little resin inside the mold, thus providing easy maintenance for the mold.

The means of carrying out another embodiment exists in the configuration that the central angle is set at 45 degrees or less.

The upper limit to the central angle is set under the above configuration. If the central angle is too large or if the pinch-off line is too much inclined from the direction of the mold parting lines, the parison has to be pressed flat on a large slope during the pinch-off process of the blow molding operation. Because under such a condition, the pinch-off operation cannot be fulfilled smoothly, preferably a central angle of 45 degrees or less is used.

The step height of the bent corners or the width of the end parting faces is adjusted by the central angle as described above. The lower limit to this central angle can be determined geometrically from the necessary step height or facial width, the size of the molded container, and the thickness of the parison wall.

The means of carrying out another embodiment exists in the configurations that the pinch-off line passing the center of the bottom surface of the mold cavity, as seen in the cross-sectional plan view of the split mold in its closed state, has the same direction as that of the mold parting lines and that the bent corners are formed almost symmetrically at the right and left ends of this pinch-off line.

Under the above configurations, the parison is pressed flat by the mold pinch-off section on the face that is perpendicular to the direction in which the split mold is clamped. In that case, the pinch-off process can be achieved more stably than in the inclined case, and a fully large step height or facial width can be used for the bent corners or the end parting faces, thus ensuring that the deformation of the parison can be reliably controlled in the lateral direction.

BRIEF DESCRIPTION OF THE DRAWINGS

FIGS. 6(a) and 6(b) are a front elevational view and a bottom plan view, respectively, of a conventional blow-molded container shown as an example.

FIGS. 15(a) and 15(b) are a front elevational view and a bottom plan view of the conventional blow-molded container shown as another example.

FIGS. 16(a) and 16(b) are a front elevational view and a bottom plan view showing the blow-molded container in the fourth embodiment of this invention.

FIGS. 17(a) and 17(b) are a front elevational view and a bottom plan view showing the blow-molded container in the fifth embodiment of this invention.

FIG. 27 includes explanatory diagrams, which are cross-sectional plan views similar to FIG. 26 and show the pinch-off process in which the split mold of FIGS. 24 and 25 is employed.

DETAILED DESCRIPTION OF EMBODIMENTS

Figure 1:
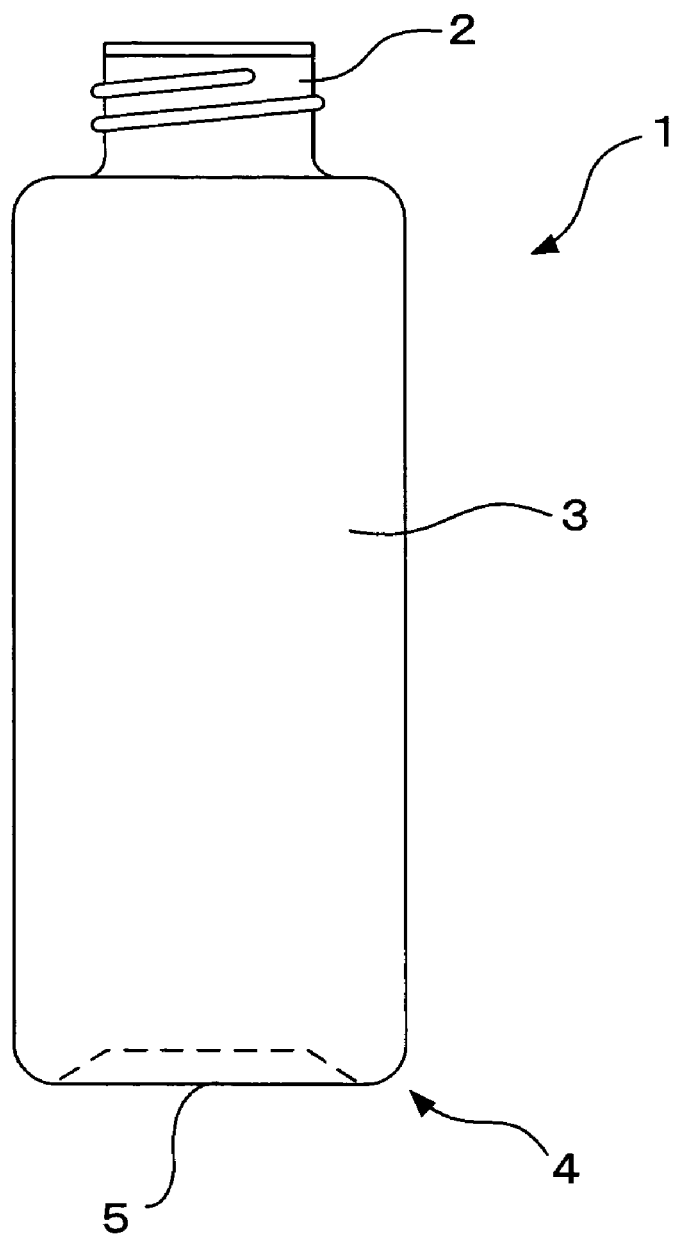
FIG. 1 is a front elevational view showing the blow-molded container in the first embodiment of this invention.
Figure 2:
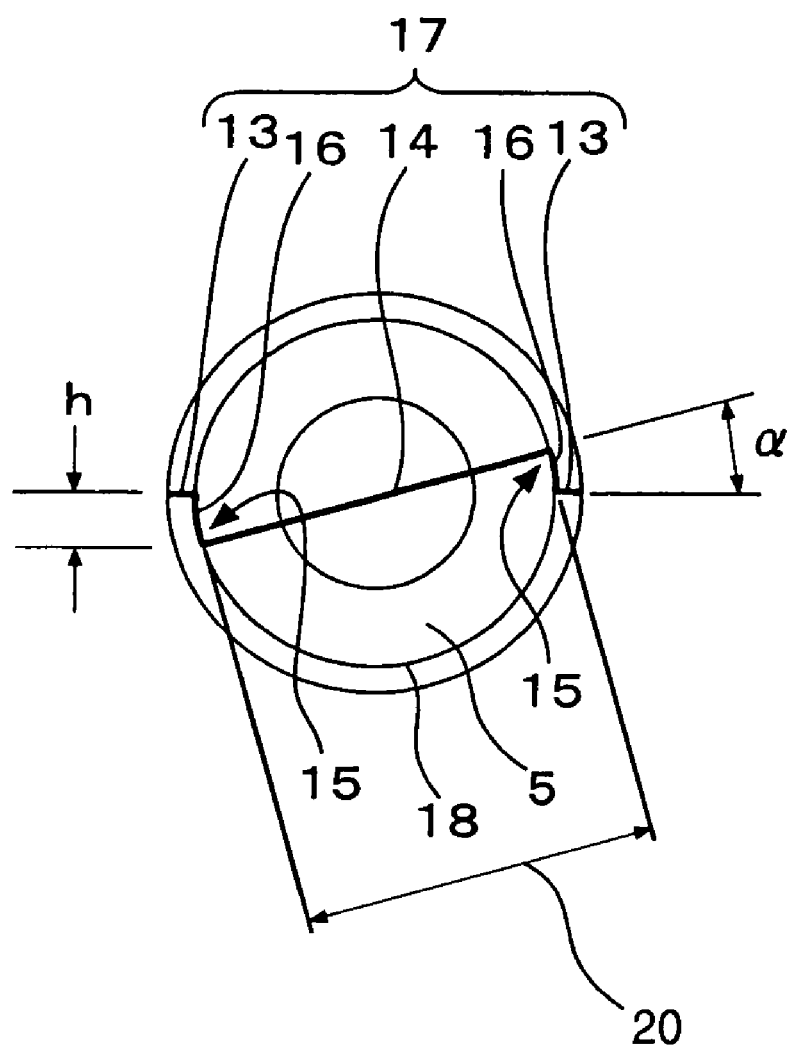
FIG. 2 is a bottom plan view of the container shown in FIG. 1.

This invention is further described with respect to preferred embodiments, now referring to the drawings. FIGS. 1 and 2 show the blow-molded container in the first embodiment of this invention. The container is a bottle having a neck 2 in the upper portion of body 3. The bottle is 120 mm in height and 40 mm in the outer diameter of the body 3 having a blow ratio of 1.8.

As shown in the bottom plan view of FIG. 2, the pinch-off line 14 is formed in the center of the underside bottom surface 5 (extending across the diameter 20), but is inclined at a central angle, $\alpha$, from the direction of a pair of mold parting lines 13, which is located on the right and left peripheries. A bottom parting line 17 is formed axisymmetrically around the center of the underside bottom surface 5 when the right and left ends of this pinch-off line 14 are connected to the inner ends of the right and left mold parting lines 13 by a pair of connecting lines 16 almost linearly along a later-described circular bottom edge line 18.

Said connecting lines 16 and the pinch-off line 14 together form a pair of bent corners 15. Parison P is pressed flat by the mold pinch-off section 105 during blow molding of the container in the first embodiment of this invention. Although flash develops in this process, it is restricted to the underside of the pinch-off section 105, as described later. The flash line on the container of this embodiment ranges from the center of underside bottom surface to the bent corners 15. The container has no glossy spot or color spot in the vicinity of the mold parting lines 13 on the sidewalls of the body 3 right above the bottom 4.

Figure 3:
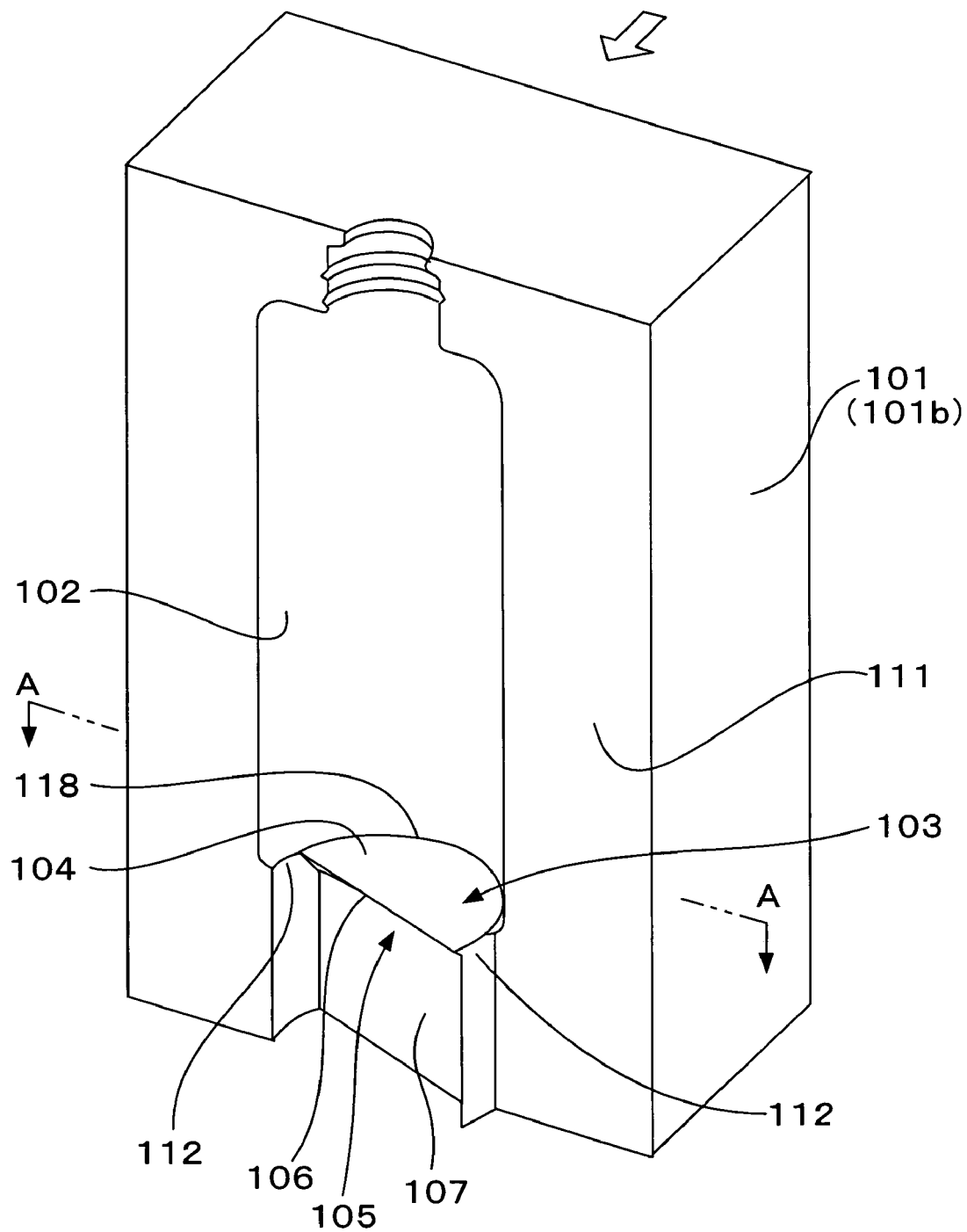
FIG. 3 is an entire perspective view showing the rear half of the split mold for blow-molding the container of FIG. 1.
Figure 4:
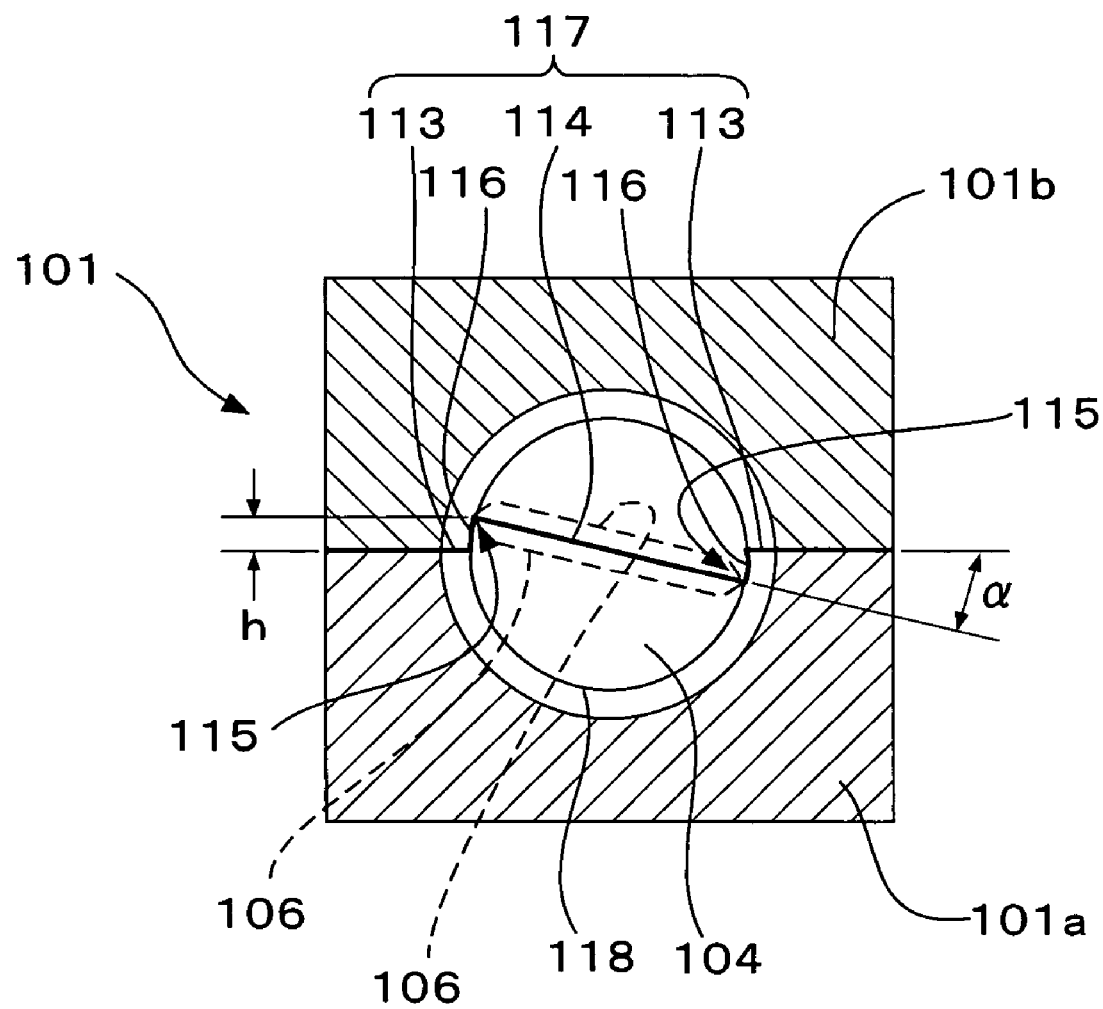
FIG. 4 is a cross-sectional plan view of the split mold of FIG. 3 in the closed state, taken from line A-A of FIG. 3 in the direction indicated by arrows.
Figure 5:
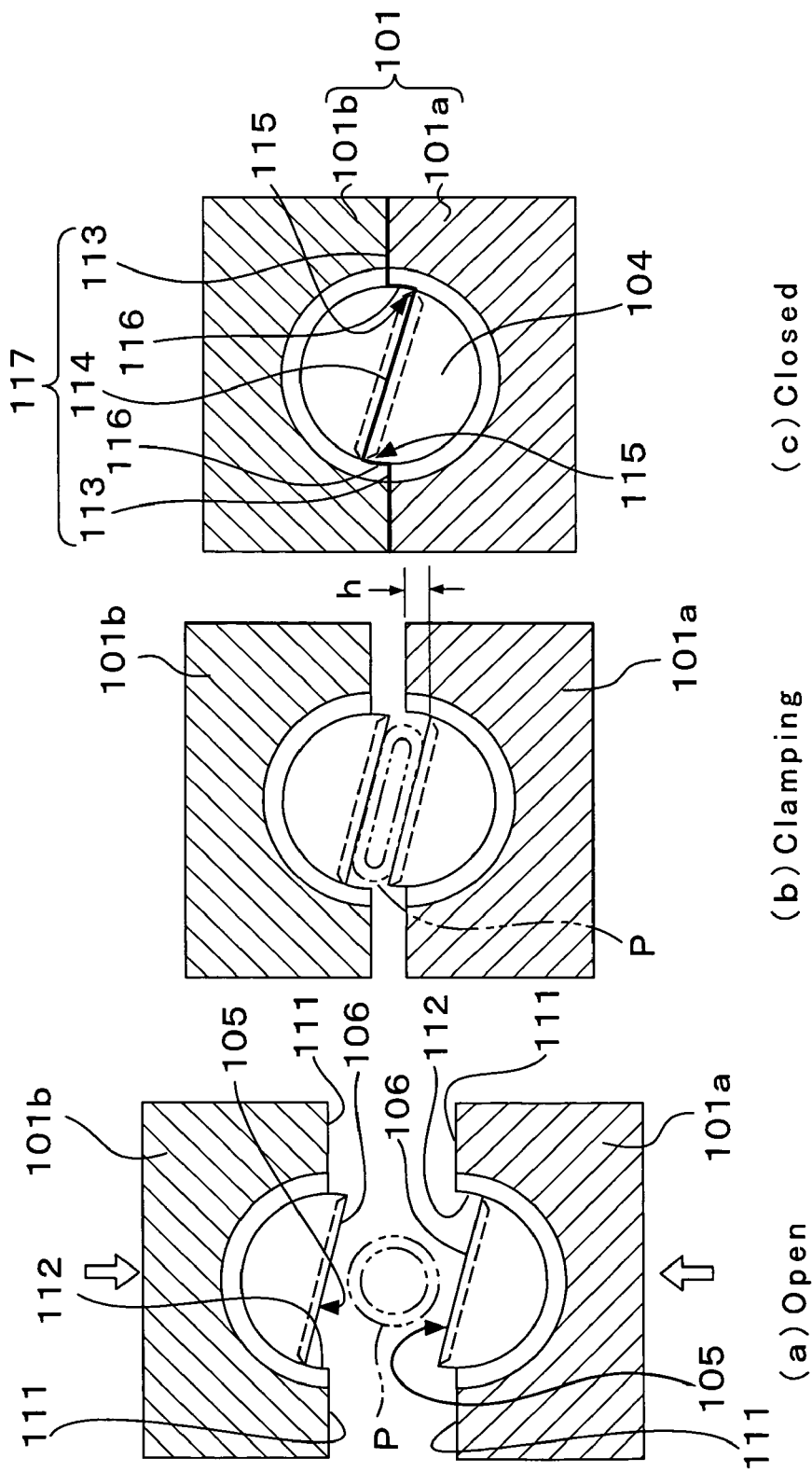
FIG. 5 includes explanatory diagrams, which are cross-sectional plan views similar to FIG. 4 and show the pinch-off process in which the split mold of FIG. 3 is employed.

FIGS. 3-5 show an example of the split mold for blow molding the container of the first embodiment. FIG. 3 is an entire perspective view of rear half 101b of the split mold 101 that has been parted into the front and rear halves. The other front half 101a has a shape roughly axisymmetrical with the rear half 101b.

In the portion under the bottom surface 104 of the bottom 103 of the mold cavity 102, the parting face caves in on one side, and steps out of the mold parting face 111 on the other side. The mold pinch-off section 105 comprises the pinch-off blades 106 that are skewed at a certain angle from the mold parting face 111.

End parting faces 112 are disposed at the right and left ends of the mold pinch-off section 105 in positions almost perpendicular to the pinch-off blades 106 that run in the lateral direction. As shown in FIG. 3, the end parting face 112 on the left side caves in from the mold parting face 111, while the end parting face 112 on the right side steps out of the mold parting face 111.

In this embodiment, a semi-columnar bottom block 107, separately prepared aside from the split mold, is fitted as part of the mold that occupies the portion under the bottom surface 104 of the bottom 103 of the mold cavity 102. Such a combination facilitates the production of split molds and enables the mold to be degassed through the interstices between the combined portions during the blow molding operation. Still another advantage is that wear resistance can be improved by changing the metal materials in the vicinity of the pinch-off section 105 including the pinch-off blades 106.

A bottom parting line 117 is formed axisymmetrically around the center of the bottom surface 104 on the bottom 103 of the mold cavity 102 under the configuration of the above-described split mold 101 in the state in which the split mold 101 has been clamped. This bottom parting line 117 comprises a linear pinch-off line 114 to be formed by the pinch-off blades that butt against each other, a pair of mold parting lines 113 to be formed by the mold parting face 111 and located on the right and left peripheries of the bottom surface 104, and a pair of connecting lines 116 that connect the right and left ends of the pinch-off line 114 with the inner ends of respective right and left mold parting lines 113. (See FIG. 4.)

The bottom parting line 117 as a whole, including the pinch-off line 114, the mold parting lines 113, and the connecting lines 116, is formed on the bottom surface 104 of said mold cavity 102. The trace of the bottom parting line 117 is left on the bottom surface 5 of the container 1. Thus, the pinch-off line 14, the mold parting lines 13, and the connecting lines 16, or the entire bottom parting line 17, is formed on the container bottom surface 5. (See FIG. 2.)

The above-described bottom block 107, when fitted to the mold, forms a bottom edge line 118 on the periphery of the bottom surface 104 of the bottom 103 of the mold cavity 102. The trace of the bottom edge line 18 is thus left on the underside surface 5 of the bottom 4 of the container 1. In the first embodiment of this invention, the connecting lines 16 are kept in an inconspicuous state because the connecting lines 16 are formed along the arcs of this bottom edge line 18.

FIG. 5 includes explanatory diagrams, which are cross-sectional plan views showing the pinch-off process in which the split mold 101 shown in FIGS. 3 and 4 is employed. With progress in the mold clamping operation, the parison P is pinched and pressed flat by the mold pinch-off section 105, which is provided with the pinch-off blades 106. At that time, a barrier function is performed by the bent corners 115 formed at the right and left ends of the pinch-off line 114, or by the end parting faces 112 formed at the right and left ends of the pinch-off section 105. Therefore, it is possible to prevent resin from flowing over the mold parting face 111 in the lateral direction, as caused by the pressure of the pinch-off blades 106 that push the flat parison.

As found from FIGS. 4 and 5, the direction of the pinch-off blades 106 is inclined at a central angle, α, from the mold parting face 111, which is perpendicular to the direction of outline arrows in FIG. 5(a), in which direction the split mold 101 is clamped a. The pinch-off process is smoothly achieved at the central angle α of up to 45 degrees.

The bent corners 115 are formed by the end parting faces 112, which have a step height (h) or facial width at least nearly twice as much as the wall thickness of the parison P. Thus, the resin can be definitely prevented from flowing in the lateral direction and reaching the mold parting face 111. (See FIG. 5(b).)

FIGS. 6(a) and 6(b) are a front elevational view and a bottom plan view, respectively, of a conventional container given for a comparison with the container in the first embodiment of this invention. This container has the same shape as in the first embodiment of this invention, but the pinch-off line 14 on the underside bottom surface 5 is formed along the direction of the mold parting lines 13. The flash line on the underside bottom surface is formed as far as the right and left peripheries of the bottom surface. As a result, there occur glossy spot and color spot in the vicinity of the mold parting lines 13 on the sidewall of the body 3 right above the bottom 4 (the positions pointed by the outline arrows on both sides in FIG. 6(a)).

Figure 7:
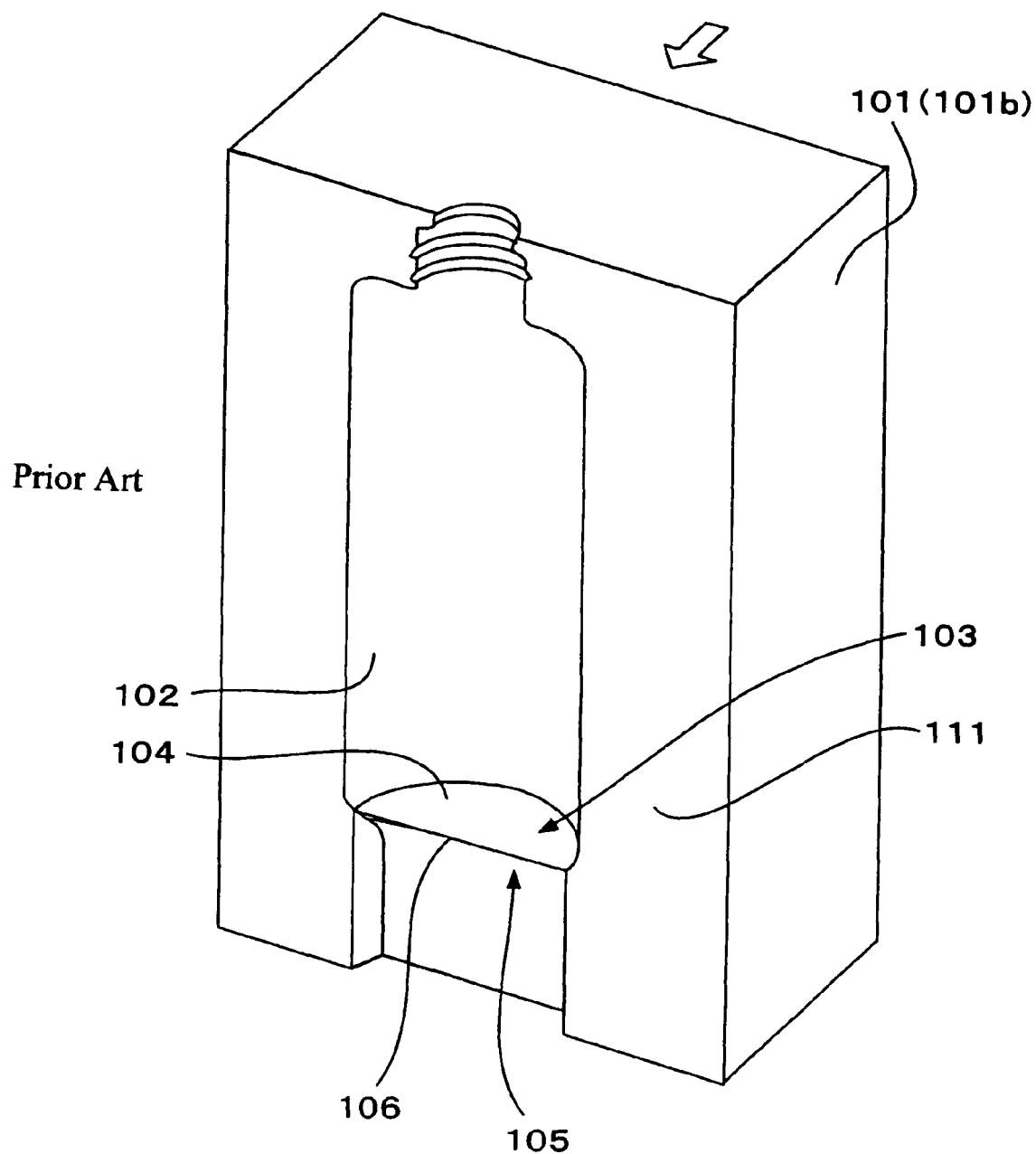
FIG. 7 is an entire perspective view showing the rear half of the conventional split mold, shown as an example, for blow-molding the container of FIG. 6.

FIG. 7 shows an example of conventional split mold, i.e., a split mold 101 for molding the container shown in FIG. 6. Such a conventional split mold 101 is parted into front and rear halves by the mold parting face 111, which is perpendicular to the mold-clamping direction (as shown by an outline arrow in FIG. 7). Pinch-off blades 106 are disposed along this mold parting face 111 to form the mold pinch-off section 105.

Figure 8:
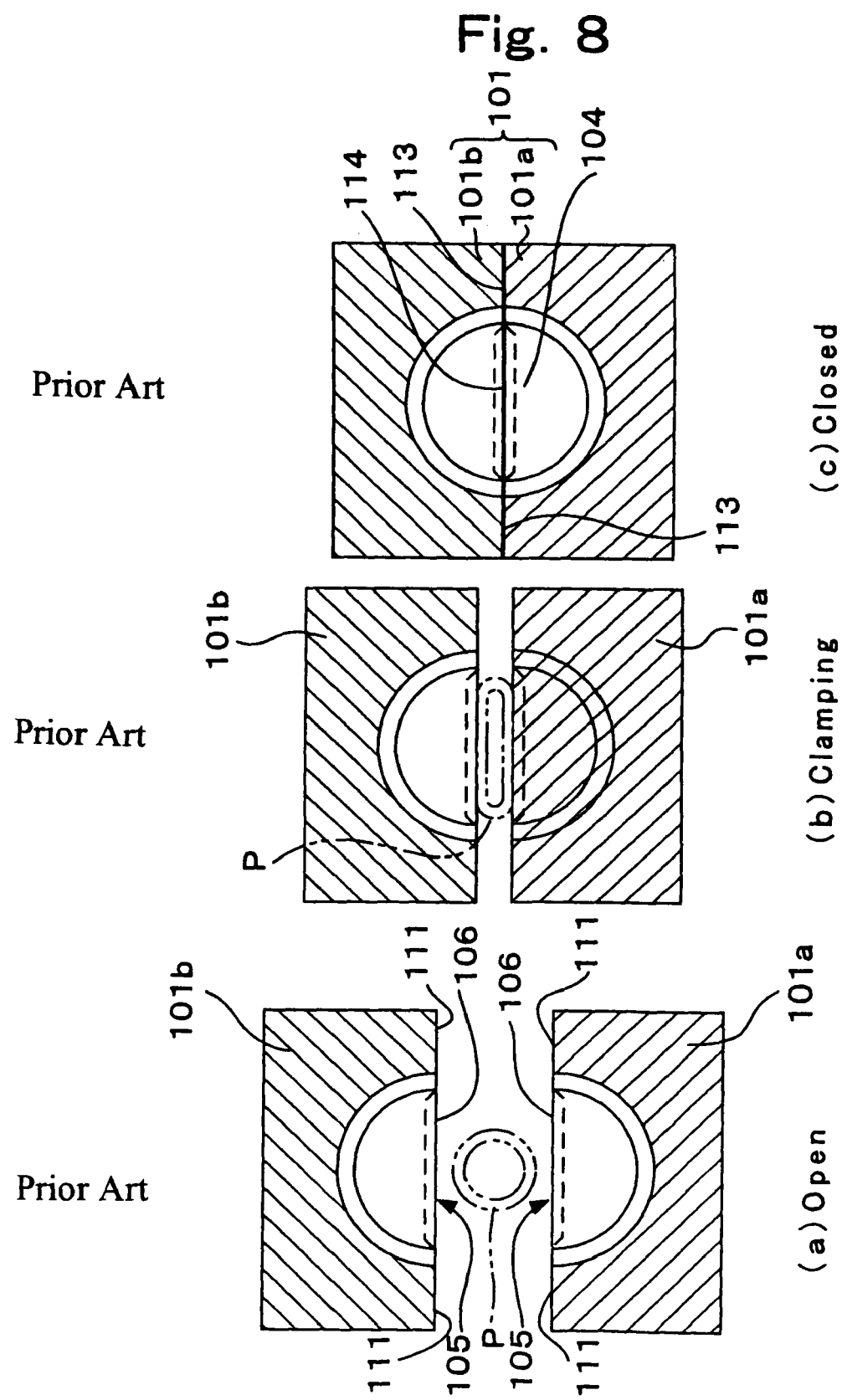
FIG. 8 includes explanatory diagrams, which are cross-sectional plan views similar to those of FIG. 5 and show the pinch-off process in which the split mold of FIG. 7 is employed.

FIG. 8 includes explanatory diagrams, which are cross-sectional plan views showing the pinch-off process in which the split mold 111 of FIG. 7 is employed. Under the closed mold condition (See FIG. 8(c)), the pinch-off line 114 and the mold parting lines 113 are aligned on a straight line. After the parison is pressed flat in the pinch-off process, the resin flows in the lateral direction and into the interstice between the mold parting faces 111. This resin flow leads to a flash line or give rise to a glossy spot or a color spot on the container 1.

Figure 9:
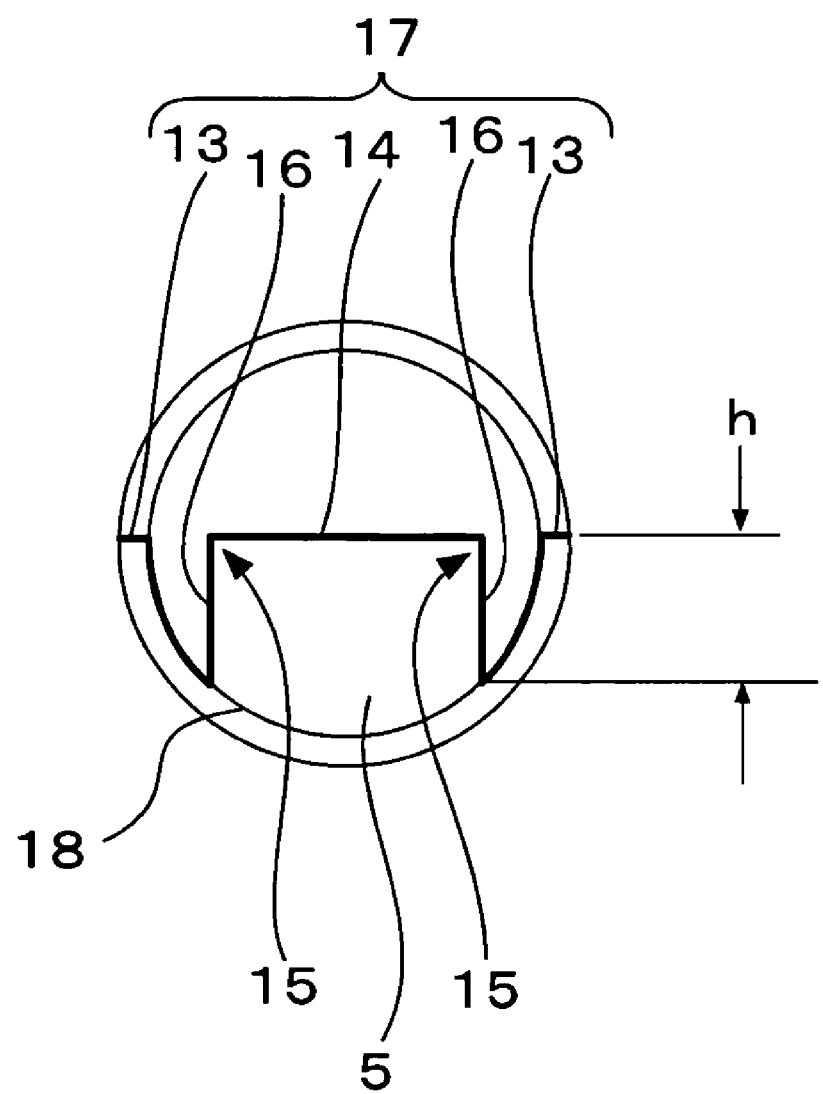
FIG. 9 is a bottom plan view showing the blow-molded container in the second embodiment of this invention.

FIG. 9 is a bottom plan view of the blow-molded container in the second embodiment of this invention. The container of the second embodiment has the same shape as in the first embodiment, but has a blow ratio of 2. The pinch-off line 14 in the center of the underside bottom surface 5 is on the same line as a pair of mold parting lines 13 disposed on the right and left peripheries. The inner ends of the mold parting lines 13 are connected to the right and left ends of this pinch-off line 14 by a pair of connecting lines 16 having the shape of animal ears. A bottom parting line 17 is thus formed in a symmetrical shape.

The connecting lines 16 form a pair of bent corners 15 roughly perpendicular to the pinch-off line 14 at both ends thereof, with both sides having a height, h. Parison P is pressed and flattened by the mold pinch-off section 105 during the blow molding of the container of the second embodiment. At that time, a flash line thus formed ranges from the center of the underside bottom surface 5 to the bent corners 15, as will be described later. The container obtained has no defective appearances, such as any flash line, glossy spot, or color spot in the vicinity of the mold parting lines 13 on the sidewall of the body 3 right above the bottom 4.

In the second embodiment of this invention, the pinch-off line 14 has a lateral length of about 1.2 Dp, which is shorter than 1.6 Dp, the flat width of the parison. However, the flash line is permitted to develop as far as the bent corners because the lateral deformation of the parison P is restricted by a part of the split mold faces during the process in which the parison P is pinched off.

Figure 10:
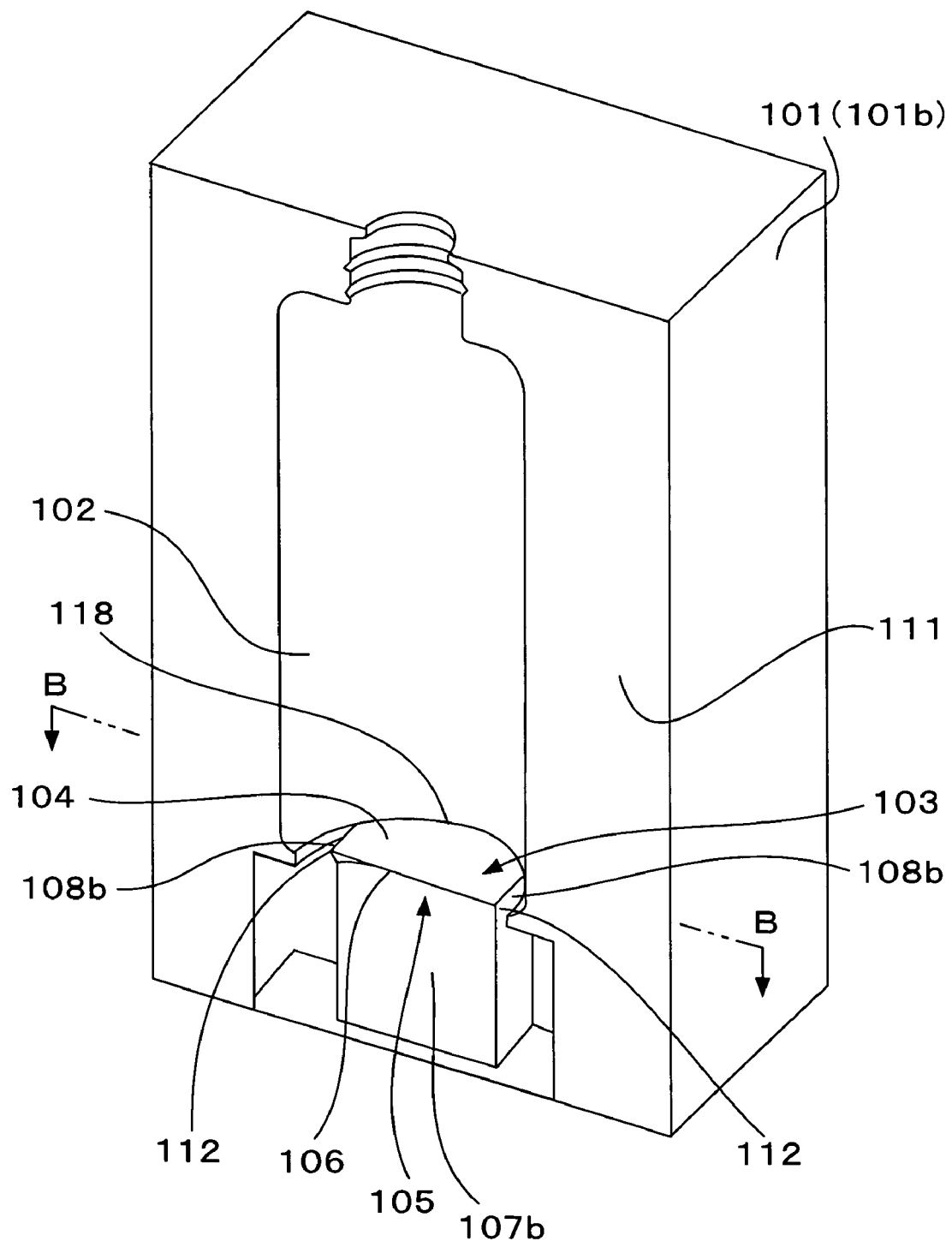
FIG. 10 is an entire perspective view showing the rear half of the split mold for blow-molding the container of FIG. 9.
Figure 11:
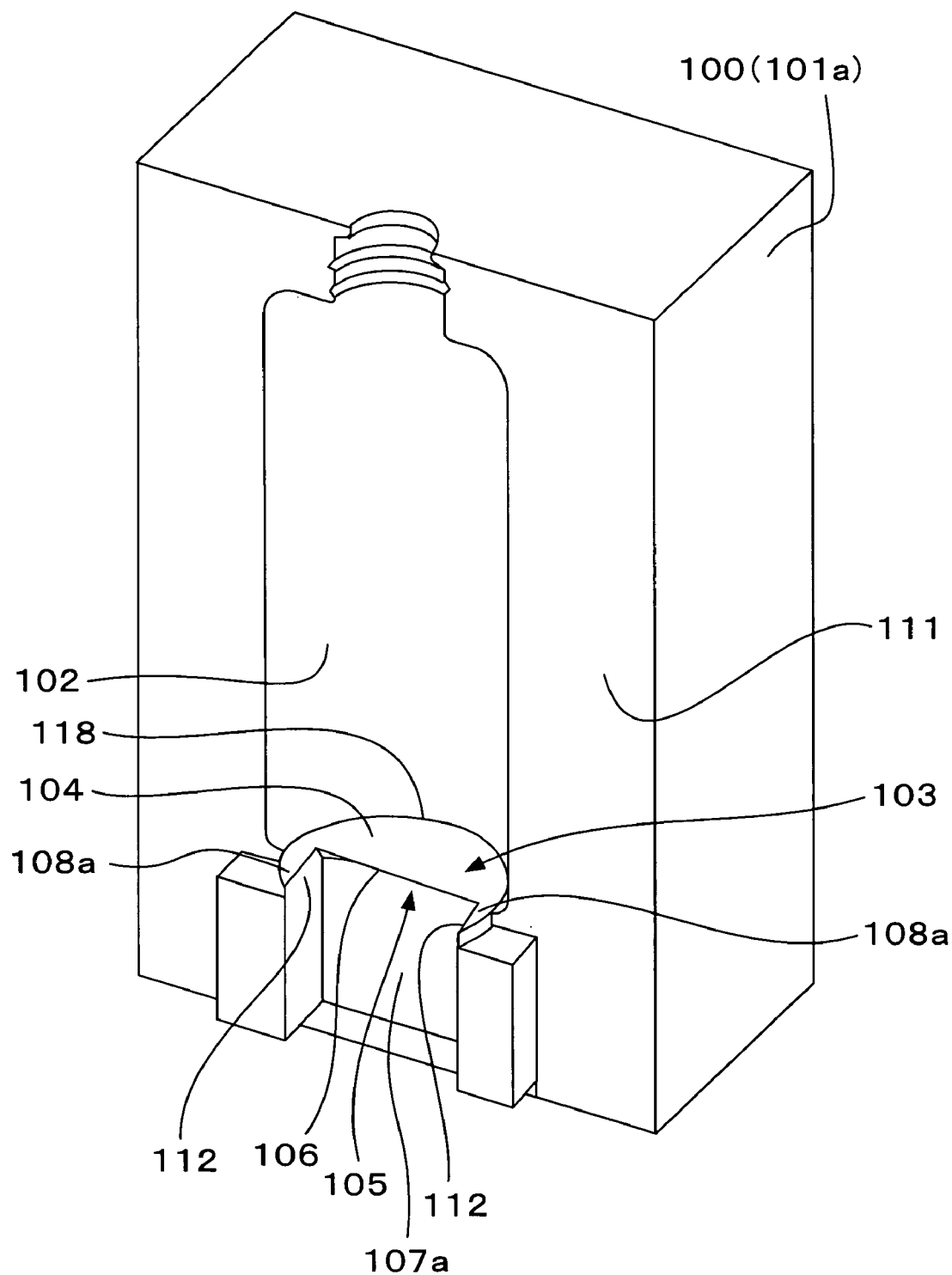
FIG. 11 is an entire perspective view showing the front half of the split mold for blow-molding the container of FIG. 9.

FIGS. 10-13 show the split mold 101 for molding the container in the second embodiment of this invention. FIGS. 10 and 11 are the entire perspective views of the rear half 101b and the front half 101a of a pair of split mold 101, parted into the respective halves.

This split mold 101 also comprises parting face with bent configuration in the portion under the bottom surface 104 of the bottom 103 of the mold cavity 102. The mold pinch-off section 105 is formed in the configuration that the pinch-off blades 106 are disposed in the direction along the mold parting face 111, i.e., in the same direction as in the conventional split mold.

End parting faces 112 are disposed at both ends of the mold pinch-off section 105 and roughly at right angles to the lateral direction of the pinch-off blades 106. As shown in FIGS. 10 and 11, a pair of recessions 108b and a pair of projections 108a, both in the shape of animal ears, partly include the end parting faces 112, and are disposed respectively in the rear and front mold halves at both ends of the pinch-off section 105. Clamping of the split mold 101 is achieved when these projections 108a are fitted into the recessions 108b.

Under the configuration of said split mold 101 in its closed state, a bottom parting line 117 is disposed symmetrically on the bottom surface 104 of the bottom 103 of the mold cavity 102, and comprises a linear pinch-off line 114 to be formed by the butting pinch-off blades 106, a pair of the mold parting lines 113 to be formed by the mold parting face 111 and to be disposed on the right and left peripheries of the bottom surface 104, and a pair of connecting lines 116 in the shape of animal ears, which connect both ends of the pinch-off line 114 to the inner ends of the right and left mold parting lines 113. (See FIG. 12.)

Traces of the pinch-off line 114, the mold parting lines 113, and the connecting lines 116 on the bottom surface 104 of said mold cavity 102 remain on the underside bottom surface 5 of the container 1. Thus, the pinch-off line 14, the mold parting lines 13, and the connecting lines 16 are formed on the underside bottom surface 5. (See FIG. 9.)

In the split mold for this embodiment, too, bottom blocks 107a and 107b, separately prepared aside from the split mold, are fitted as part of the mold that occupies the portion under the bottom surface 104 of the bottom 103 of the mold cavity 102.

Figure 12:
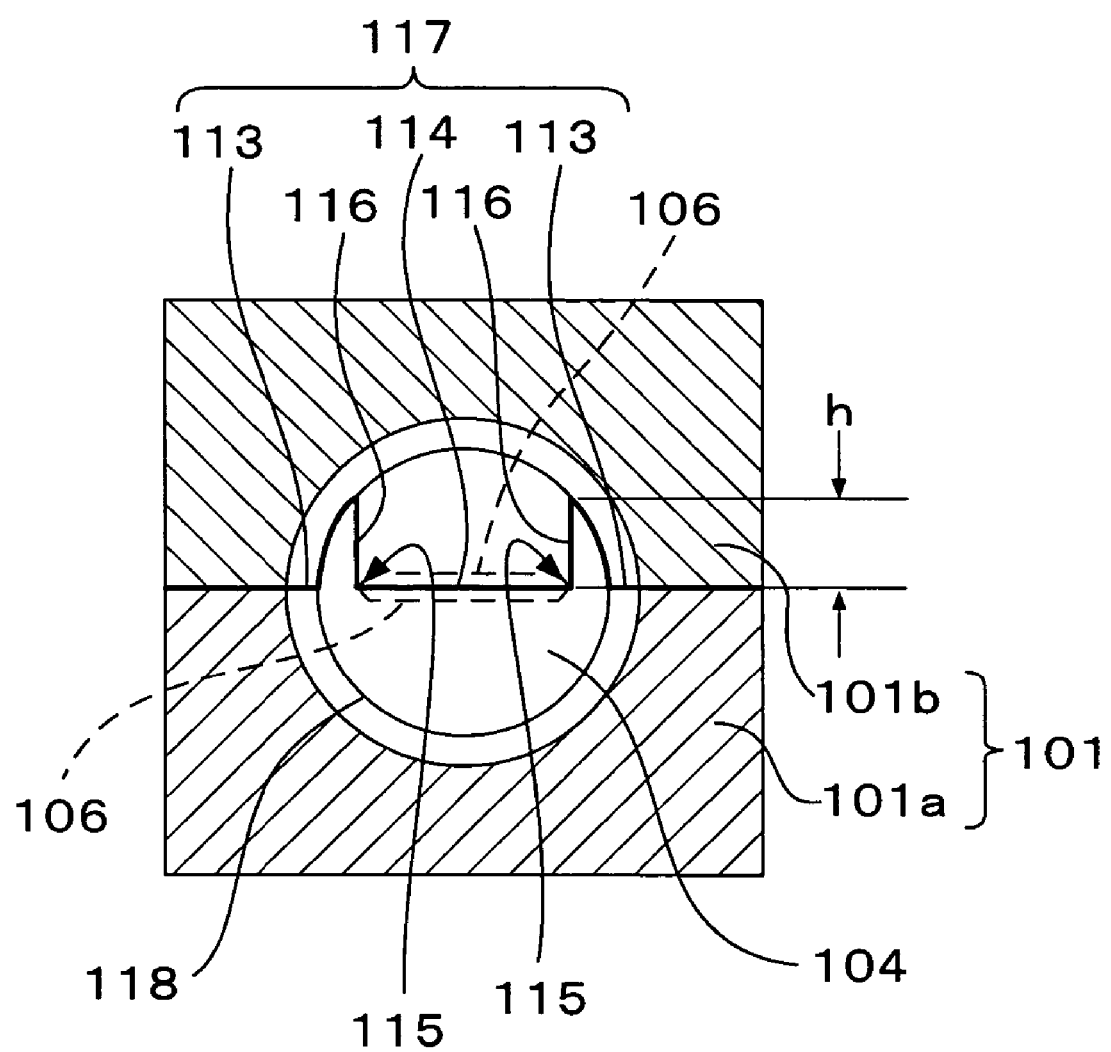
FIG. 12 is a cross-sectional plan view of the split mold of FIGS. 10 and 11 in the closed state, taken from line B-B of FIG. 10 in the direction indicated by arrows.
Figure 13:
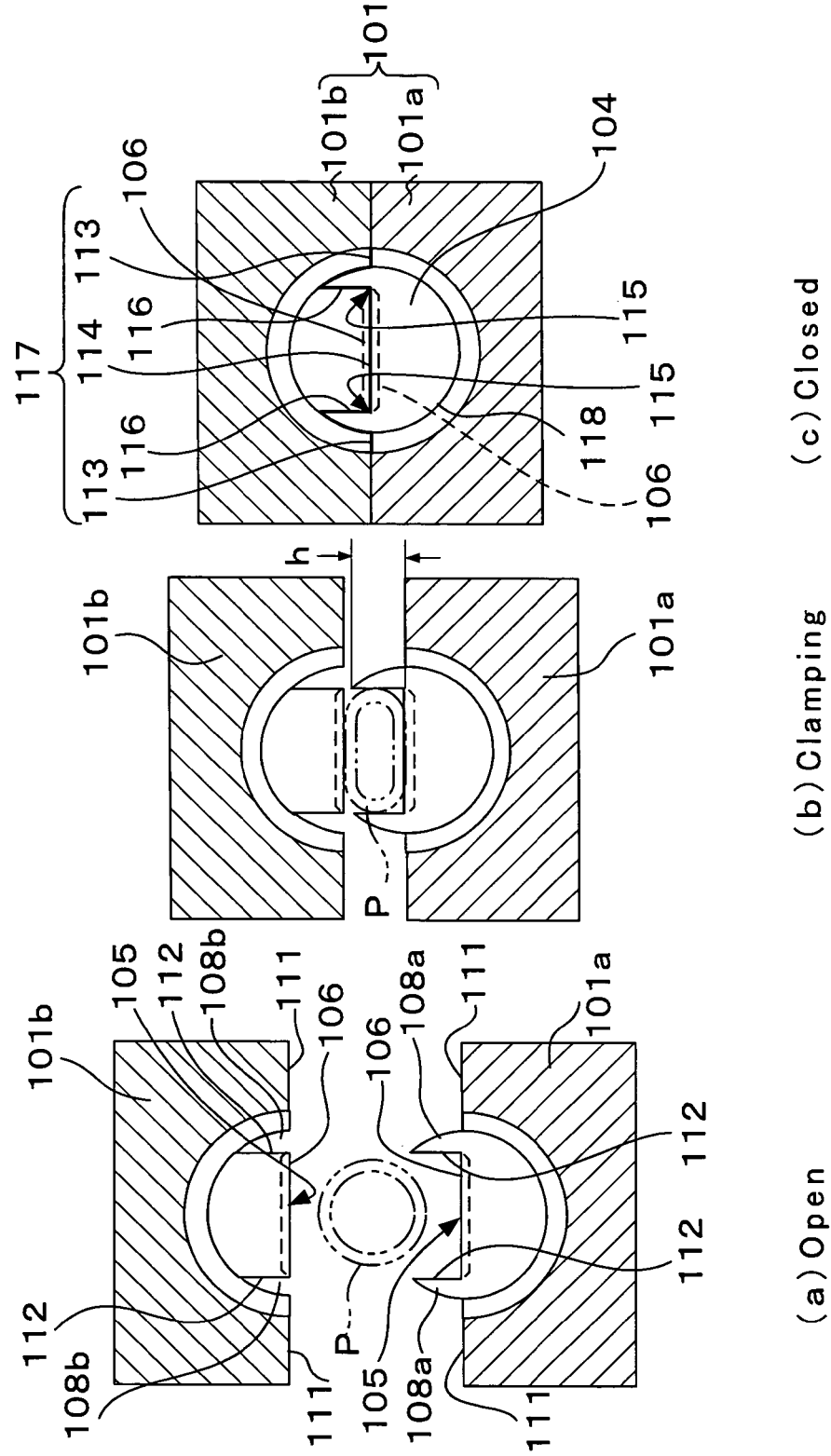
FIG. 13 includes explanatory diagrams, which are cross-sectional plan views similar to FIG. 12 and show the pinch-off process in which the split mold halves of FIGS. 10 and 11 are employed.

FIG. 13 comprises explanatory diagrams showing a pinch-off process using the split mold 101 of FIGS. 10-12. The cylindrical parison P is pressed from both sides to turn into an oval shape. In a certain flat state, as shown in FIG. 13(b), a barrier function is fulfilled by the end parting faces 112, which are a part of the projections 108a having the shape of animal ears and serving for the front mold half 101a. Further lateral deformation of the resin is thus inhibited. Thereafter, the parison P is pressed flat within the range of the width of the right and left end parting faces 112. An extra amount of resin is forced to flow downward from under the pinch-off blades 106.

Under the configuration of the container in the second embodiment of this invention, the mold pinch-off section 105 presses and flattens the parison P on the face perpendicular to the clamping direction of the split mold 101. The pinch-off process can be operated more smoothly than when the blades are inclined. In addition, the bent corners 15 are allowed to have a full height. Therefore, it is fully possible for the pinch-off line 14 to have a length of 1.6 Dp or less.

Figure 14:
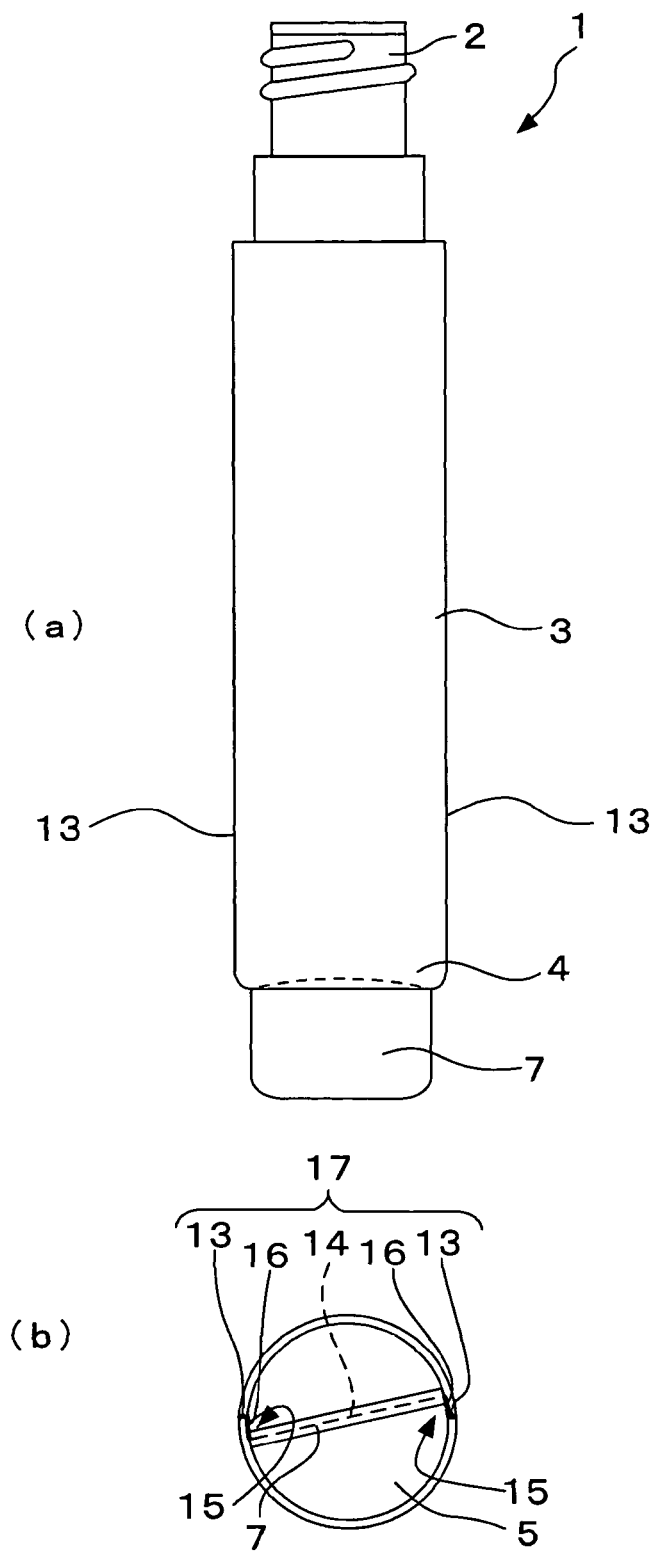
FIGS. 14(a) and 14(b) are a front elevational view and a bottom plan view showing the blow-molded container in the third embodiment of this invention.

FIG. 14 shows a front elevational view and a bottom plan view of a blow-molded container in the third embodiment of this invention. The container 1 of a small size is obtained by the direct blow molding. A cylindrical body 3 is disposed on bottom 4, and round neck 2 is disposed on the body 3. A cap equipped with a shafted brush is fitted to the container by screwing the cap on the neck 2. This container is used for mascara or eye liner. For the convenience of clarifying the contrast between this third embodiment and a later-described conventional example, FIG. 14 and later-described FIG. 15 show the containers in the state before removing flash 7, which is extra resin that runs off in the vicinity of the mold pinch-off section.

The body 3 of this container 1 is 15 mm in diameter and 75 mm in height. A bottom parting line 17 in the same shape and configuration as in the first embodiment is formed on the underside surface of the bottom 4.

This container 1 is blow-molded by using a parison having an outer diameter of 10 mm. The container has a blow ratio as small as 1.5 (15 mm/10 mm) over the area ranging from the body 3 to the bottom 4. However, as obvious from the range in which flash 7 is formed, the flash line extends only as far as the bent corners 15. The container has no defective appearances, such as flash line, glossy spot, or color spot, in the vicinity of the mold parting line 13 on the sidewall of the body 3 right above the bottom 4.

FIG. 15 shows the conventional blow-molded container in another example obtained from conventional split mold to make a comparison with the container in the third embodiment of this invention. The container 1 has the same shape as in the third embodiment. If a container 1 having a blow ratio of 1.5, i.e., lower than 1.6, is molded in the conventional split mold, flash 7, such as shown in FIG. 15, develops not only in the portion of the pinch-off line 14, but also runs off from the mold parting line 13. Consequently, the flash line is inevitably formed in the vicinity of the mold parting lines on the sidewall of the body 3 right above the bottom 4.

FIG. 16 shows a front elevational view and a bottom plan view of the blow-molded container in the fourth embodiment of this invention. It is a small container 1 obtained by the direct blow molding. A cap equipped with a small manual pump is screwed on the neck 2, and the container is used as a discharge container for liquid cosmetic materials.

The body 3 of this container 1 is 23 mm in diameter and 75 mm in height. A bottom parting line 17 in the same shape and configuration as in the first embodiment is formed on the underside surface of the bottom 4. The bent corners 15 have a step height (h) or a facial width of 3 mm and a central angle, α, of 15 degrees.

This container 1 is blow-molded by using a parison having an outer diameter of 19 mm. The container has a blow ratio as small as 1.2 (23 mm/19 mm) over the area ranging from the body 3 to the bottom 4. However, the flash line extends only as far as the bent corners 15. The container has no defective appearances, such as flash line, glossy spot, or color spot, in the vicinity of the mold parting lines 13 on the sidewall of the body 3 right above the bottom 4.

FIG. 17 shows a blow-molded container in the fifth embodiment of this invention. The container 1 in the shape of a test tube is molded from a parison with an outer diameter of 18 mm and is provided with a neck ring 8. The container is 105 mm high, and the body 3 has a diameter of 24 mm at the upper end and a gradually reduced diameter of 22 mm roughly at the middle height. Bottom 4 is in a semi-spherical shape. The body has a blow ratio of 1.2 in a position right above the bottom 4. A bottom parting line 17 in the almost same shape as in the first embodiment is formed on the underside bottom surface 5. This bottom parting line 17 extends as far as the bent corners 15 on the semi-spherical underside bottom surface 5.

Figure 18:
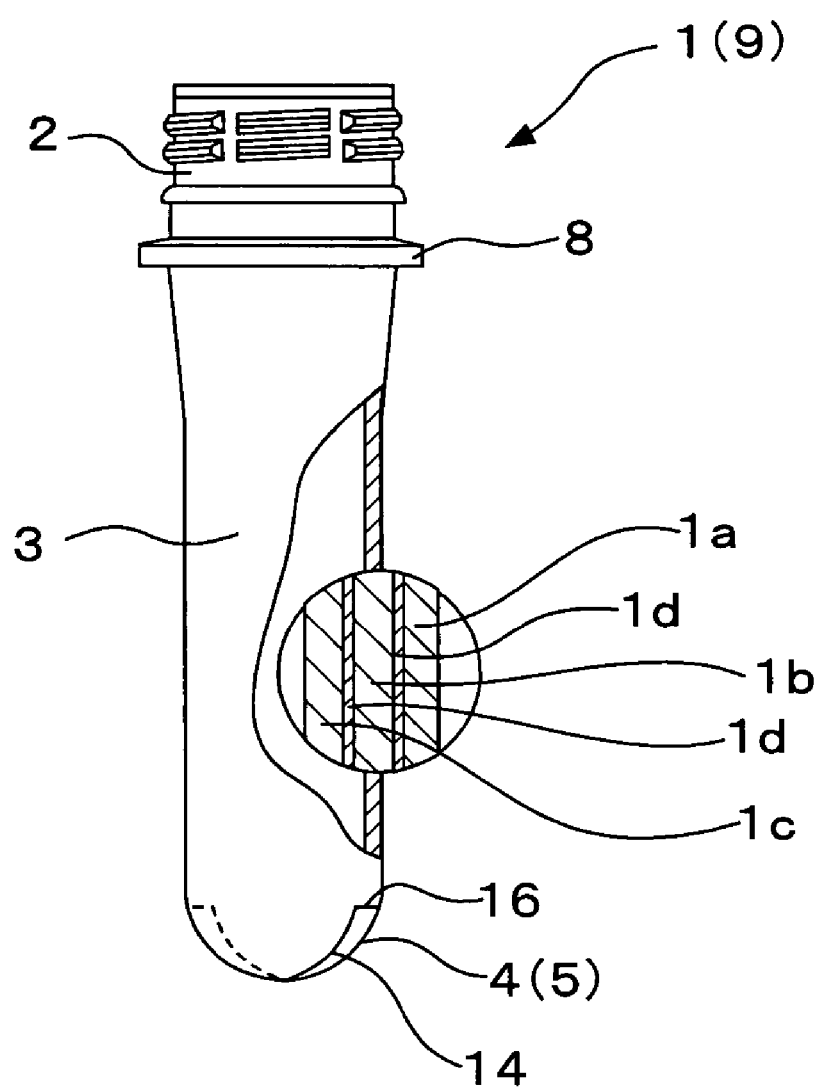
FIG. 18 is a partly cross-sectional, front elevational view showing the blow-molded container in the sixth embodiment of this invention.
Figure 19:
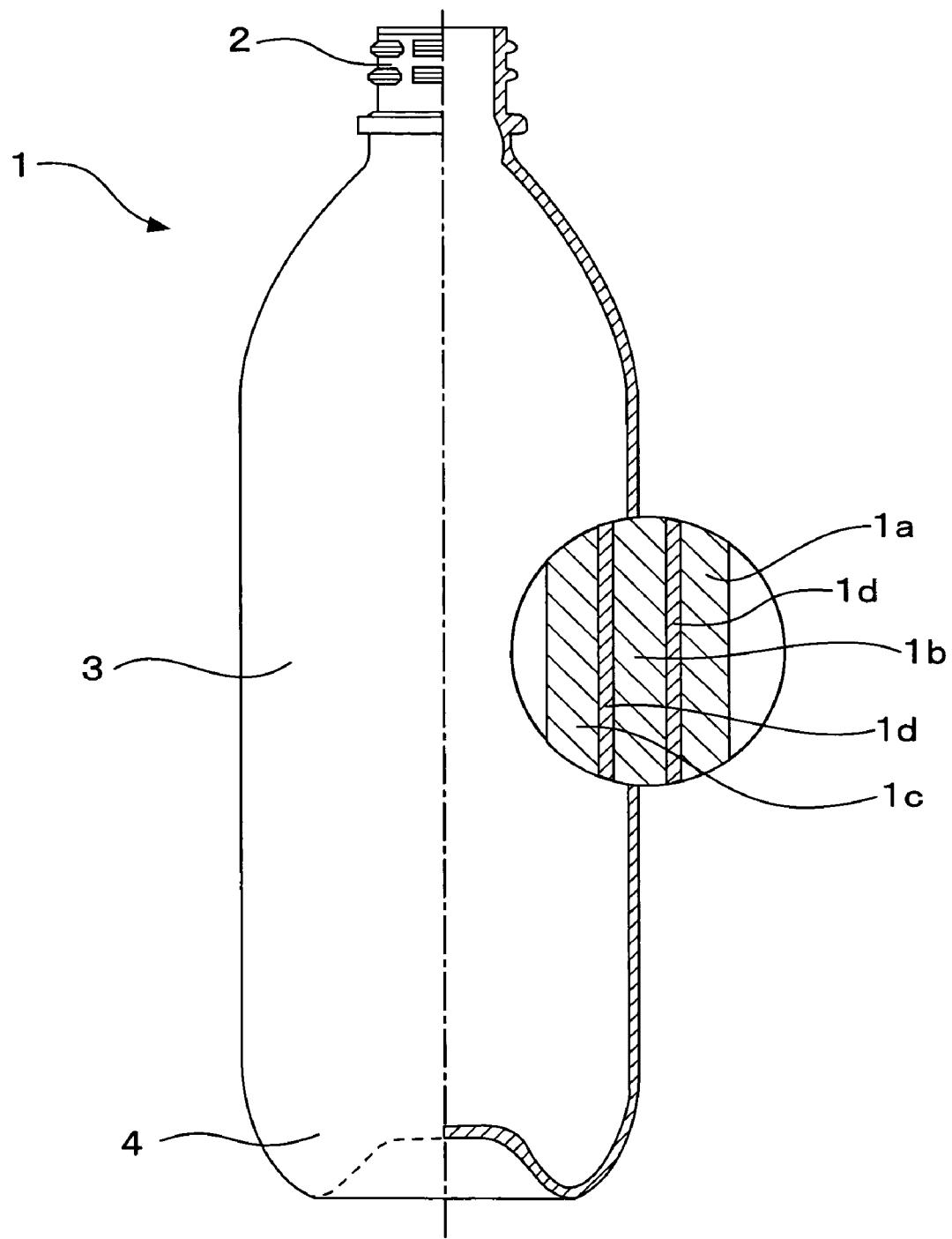
FIG. 19 is a partly cross-sectional, front elevational view of the biaxially drawn, blow-molded container obtained from the primary molded product of FIG. 18.
Figure 20:
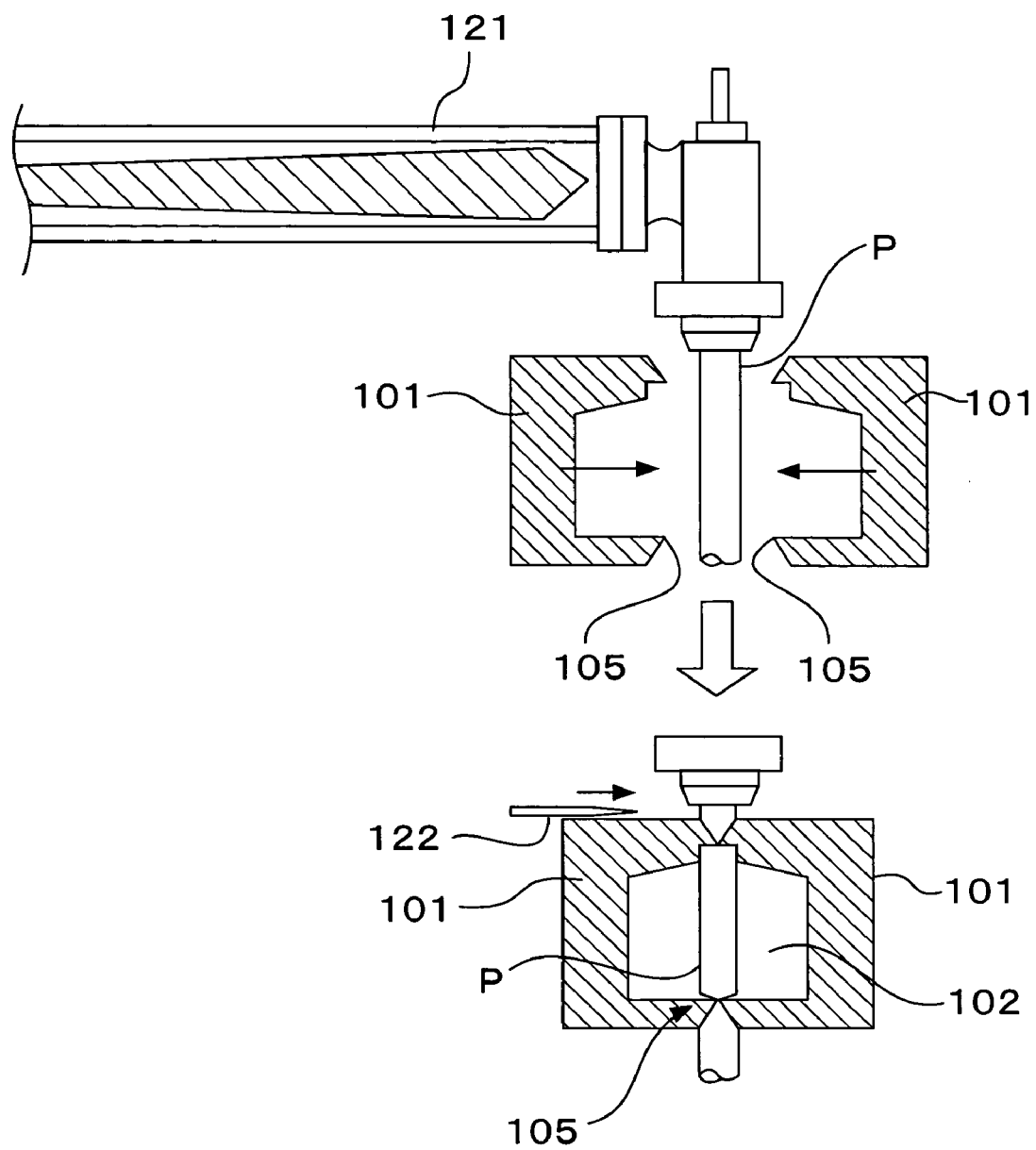
FIG. 20 is an explanatory diagram showing the mold-clamping process in the blow molding operation.

FIG. 18 shows a blow-molded container in the sixth embodiment of this invention. This container is similar to the container of the fifth embodiment but is made by using a multi-layer wall. The container 1 shown in FIG. 19 is obtained by drawing biaxially and blow molding the container of the fifth embodiment, which is a primary molded product 9 and is used as a so-called preform.

The parison having a multi-layer wall makes it simple to mold a direct blow-molded container of the laminated structure, and such a goal as wall thickness ratio required in the laminated structure can be achieved in high precision. When this direct blow-molded container is used as a preform, it becomes possible to manufacture a biaxially drawn, blow-molded container of the laminated type easily.

At the time of air blow, a core guide having an air nozzle is inserted into the parison from above during the direct blow molding process. At that time, the mouth can be sealed by inner layer. Even if a water-absorbing resin, such as an ethylene vinyl alcohol copolymer or nylon, is used as the intermediate layer of a direct blow-molded preform, water can be prevented from entering the container through the neck, and it becomes easy to keep the preform under storage management before the preform is biaxially drawn and blow-molded. Examples of actual laminated structure are as shown below.

The first examples of a primary molded product 9 in the laminated structure comprise the combinations of a PET layer or layers and a PEN layer or layers. The first combination comprises an outer PET layer 1a and an inner PEN layer. The second combination comprises an outer PET layer 1a, an intermediate PEN layer 1b, and an inner PET layer 1c. The third combination comprises an outer PEN layer 1a and an inner PET layer 1c. The fourth combination comprises an outer PEN layer 1a, an intermediate PET layer 1b, and an inner PEN layer 1c. Each combination may have an adhesive layer or layers 1d between layers.

The first and the fourth combinations in the first example have the configurations in which PEN is used as the inner layer 1c. This ensures that a container having high chemical resistance (alkali resistance) can be obtained. In all configurations of the first example, a UV cutoff function can be obtained by giving the PEN layer a thickness in the range of 1-20% so that UV rays at 370 nm or less may be cut off.

The second examples of the primary molded product 9 in the laminated structure comprise the combinations of an outer PET layer 1a and an inner PET layer 1c, along with an intermediate layer 1b using a gas barrier resin. The first combination comprises an intermediate layer 1c made of an ethylene vinyl alcohol copolymer. The second combination comprises an intermediate layer 1b made of a polyamide containing xylylene radicals (MXD nylon). The third combination comprises an intermediate layer 1b made of polyacrylonitrile. An adhesive layer or layers 1d are sandwiched between layers. In these second examples, the container 1 obtained has a barrier property against oxygen, carbon dioxide, etc., which cannot be prevented fully by the PET only. In addition, a container 1 having no delamination can be obtained reliably.

The third examples of the primary molded product 9 in the laminated structure comprise the combinations of an outer layer 1a of polyethylene or polypropylene, an inner layer 1c using an ethylene vinyl alcohol copolymer or a PET-related resin, and an adhesive layer 1d used to adhere the outer layer 1a with the inner layer 1c. Under this configuration, the container 1 prevents effective components of the contents, such as limonene and vitamins, from being absorbed into the container wall.

The fourth examples of the primary molded product 9 in the laminated structure comprise the combinations of an outer layer 1a made of polyethylene or polypropylene, an intermediate layer 1b made of a gas barrier resin, such as a polyamide containing xylylene radicals, and an inner layer 1c made of polyethylene or polypropylene, with adhesive layers 1d being used to adhere these layers. The container 1 obtained has a high gas barrier property.

The fifth examples of the primary molded product 9 in the laminated structure comprises a combination of an outer layer 1a made of nylon-6, an inner layer 1c made of polyethylene or polypropylene, and an adhesive layer 1d used to adhere these layers. A thin-walled container 1 in this configuration has a high stabbing strength and a high degree of surface glossiness.

The sixth example of the primary molded product 9 in the laminated structure comprises a combination of an outer layer 1a and an inner layer 1c, both made of virgin PET resin, and an intermediate layer 1b made of a reworked PET resin. In this configuration, reworked resin can be safely utilized under the condition in which the layer thickness is easily controllable. This container can be dealt with as a PET bottle at the time when waste bottles are separately collected.

The seventh example of the primary molded product 9 in the laminated structure comprises a combination of an outer layer 1a containing an antistatic agent in the PET, an intermediate layer 1b containing a UV-absorbing agent in the PET, and an inner layer 1c made of virgin PET resin. The container in this configuration has a high antistatic effect and no loss of the UV-absorbing agent caused by bleed-out because the UV-absorbing agent is added to the intermediate layer. The container can be filled with contents safely, with no regard to the use of additives. It should be understood that the resin usable in this example is not limited to PET, but similar effects is also available from other resins.

The eighth example of the primary molded product 9 in the laminated structure comprises a combination of an outer layer 1a, which is made of a synthetic resin, such as polyethylene, polypropylene, PET, etc., and is formed as an outer shell having a necessary ability to remain in the original shape, and an inner layer 1c, which is molded into a flexible inner bag and is made of nylon, ethylene vinyl alcohol copolymer, polyethylene terephthalate, etc., having low compatibility with the outer layer 1a. This example provides a delaminated container.

The ninth example of the primary molded product 9 in the laminated structure employs an outer layer 1a of polypropylene or polyethylene, which is either glazed or frosted. The product surfaces can be easily glazed or frosted.

The tenth example of the primary molded product 9 in the laminated structure comprises a combination of an outer layer 1a made of an ethylene vinyl alcohol copolymer or PET and an inner layer 1c made of a polyolefin resin. The container of this example can have the surface glazed.

Figure 21:
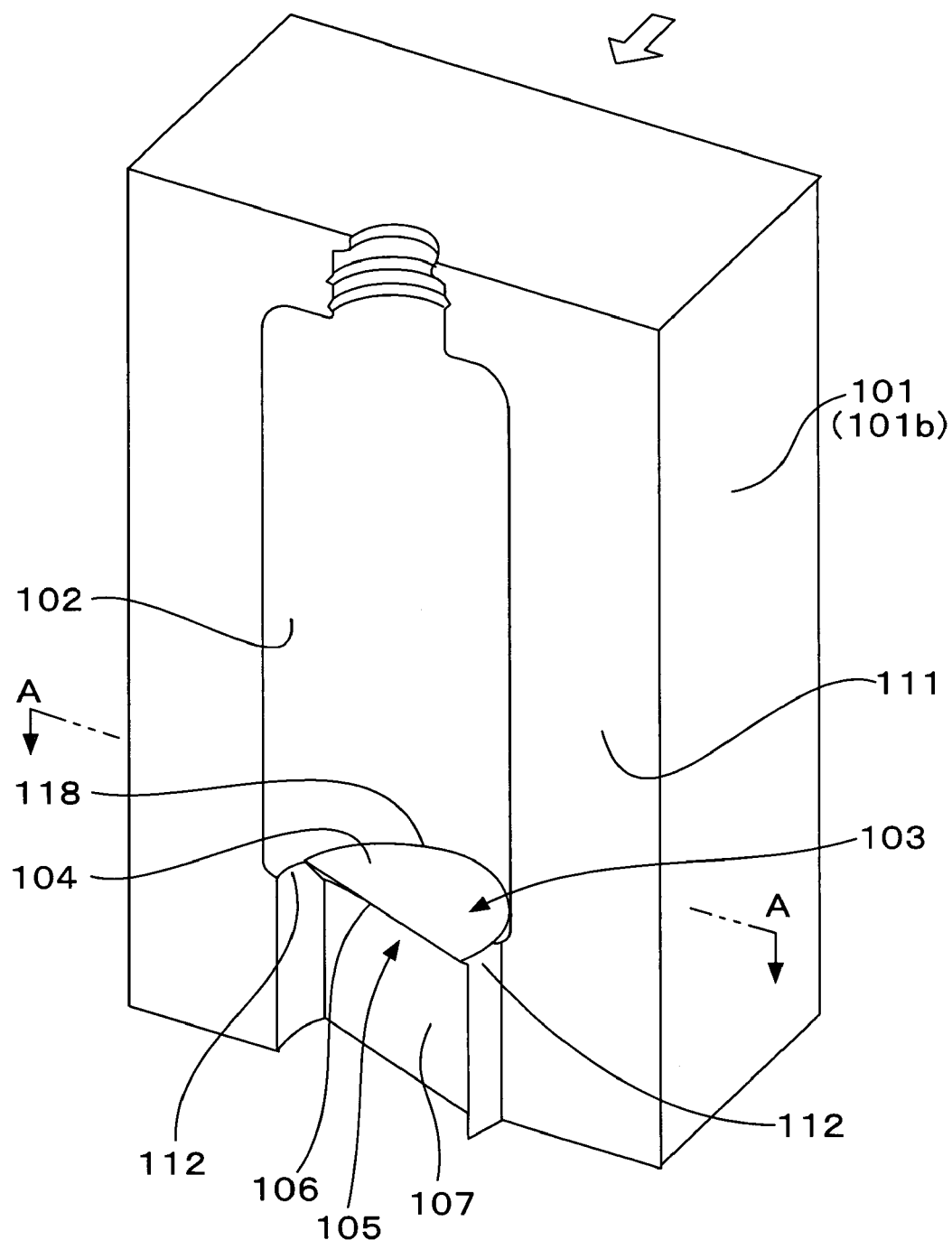
FIG. 21 is an entire perspective view showing the rear half of the split mold in the first embodiment of this invention relating to a mold.
Figure 22:
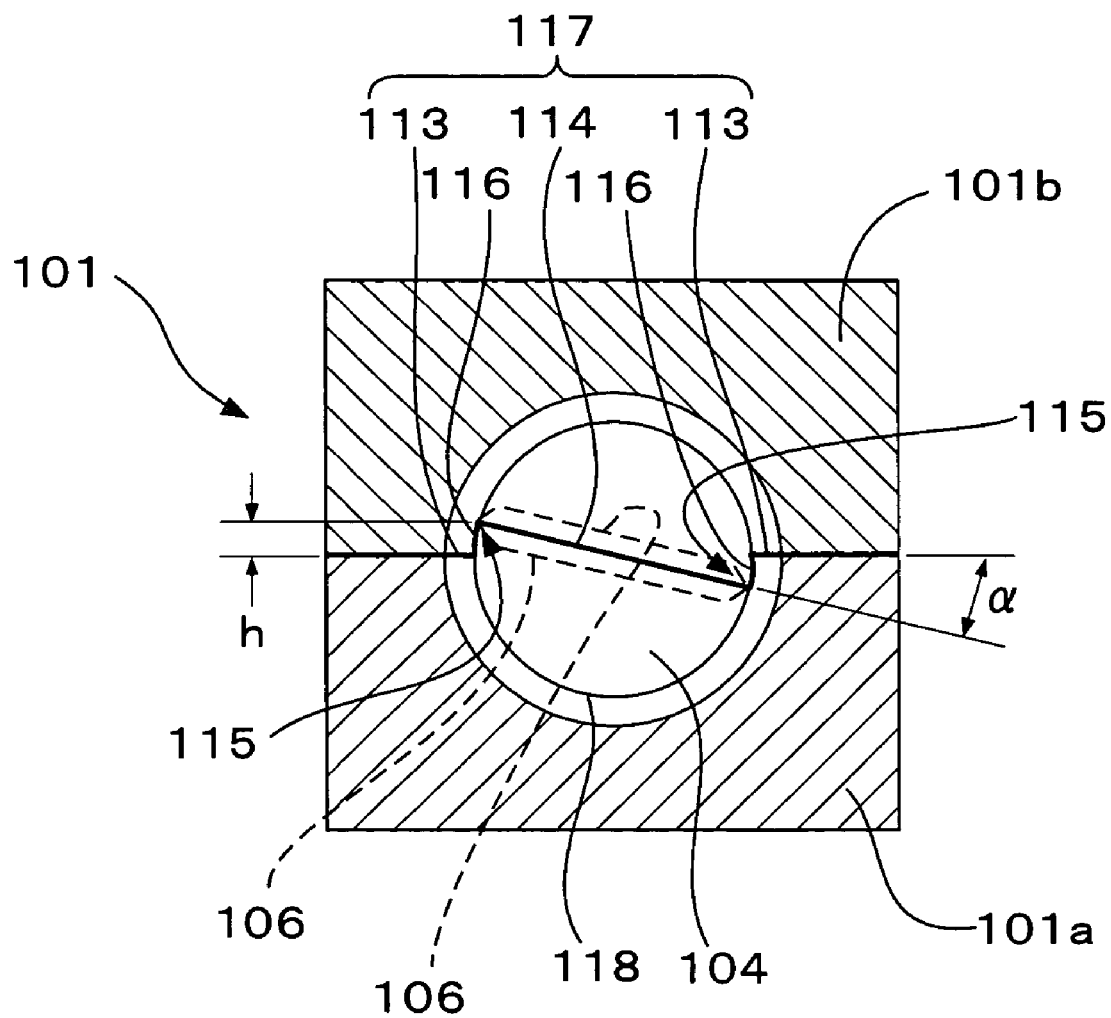
FIG. 22 is a cross-sectional plan view of the split mold of FIG. 21 in its closed state, taken from line A-A of FIG. 21 in the direction indicated by arrows.
Figure 23:
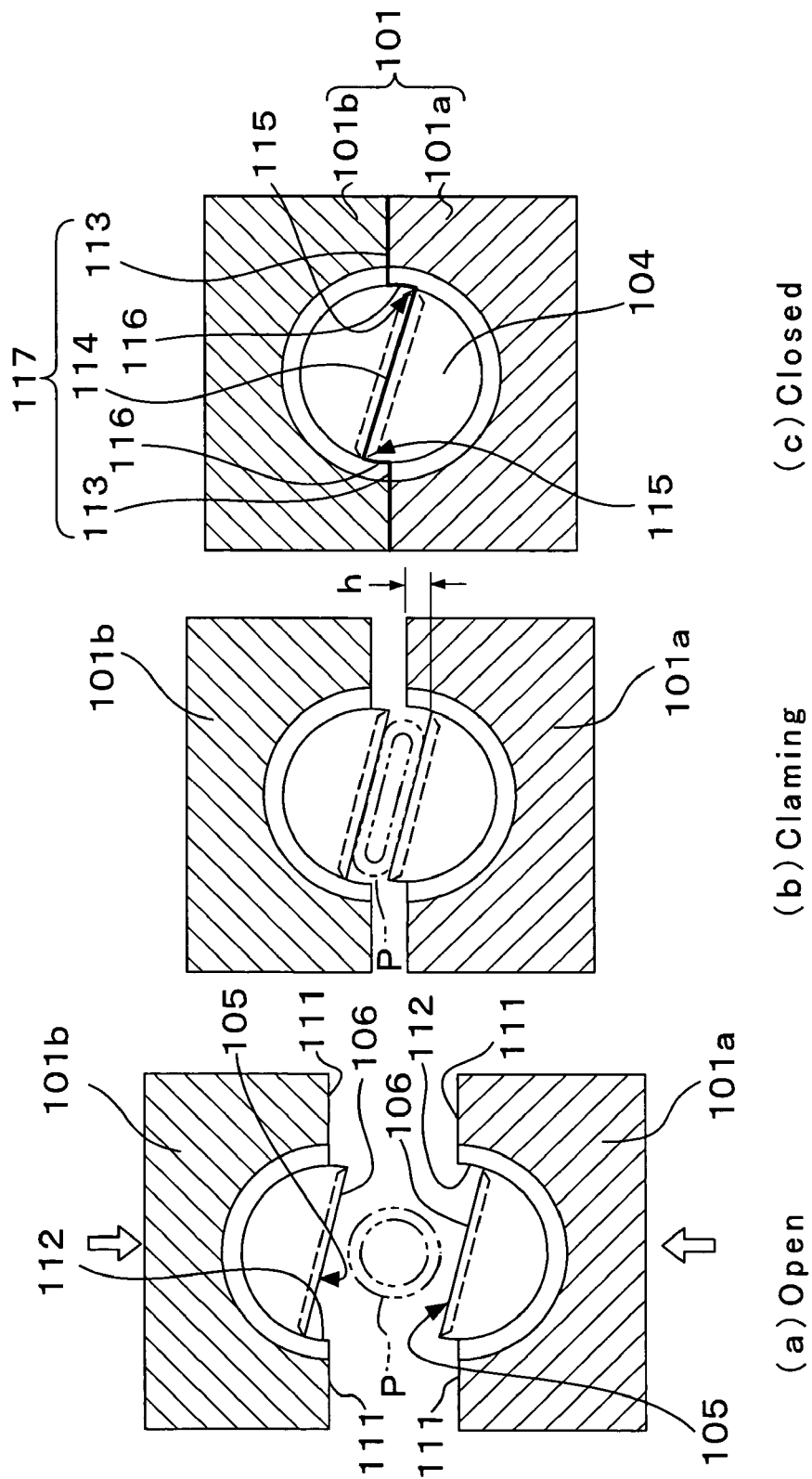
FIG. 23 includes explanatory diagrams, which are cross-sectional plan views similar to FIG. 22 and show the pinch-off process in which the split mold of FIG. 21 is employed.

FIGS. 21-23 show the split mold 101 in the first embodiment of this invention relating to a mold, which is a mold for use in blow molding. FIG. 21 is an entire perspective view of the rear half 101b of the split mold 101 that has been parted into the front and rear halves. The other front half 101a has a shape roughly axisymmetrical with the rear half 101b. This split mold 101 is used to mold a container having a cylindrical body with a blow ratio of 1.8.

FIG. 7 shows an example of conventional split mold. The entire split mold 101 is parted into front and rear halves by the mold parting face 111, which is perpendicular to the mold-clamping direction (as shown by an outline arrow in FIG. 7). Pinch-off blades 106 are disposed along this mold parting face 111 to form the mold pinch-off section 105. On the contrary, in the case of the split mold 101 in the first embodiment of this invention, as shown in FIG. 21, the parting faces form the bent corners in the portion under the bottom surface 104 of the bottom 103 of the mold cavity 102. The mold pinch-off section 105 comprises the pinch-off blades 106 that are skewed at a certain angle from the mold parting face 111.

End parting faces 112 are disposed at the right and left ends of the mold pinch-off section 105 in positions almost perpendicular to the lateral direction of the pinch-off blades 106. The end parting face 112 on the left side caves in from the mold parting face 111, while the end parting face 112 on the right side steps out of the mold parting face 111.

In this first embodiment, a semi-columnar bottom block 107, separately prepared aside from the split mold, is fitted as part of the mold that occupies the portion under the bottom surface 104 of the bottom 103 of the mold cavity 102. Such a combination facilitates the production of split molds and enables the mold to be degassed through the interstices between the combined portions during the blow molding operation. Still another advantage is that wear resistance can be improved by changing the metal materials in the vicinity of the mold pinch-off section 105 including the pinch-off blades 106.

FIG. 22 is a cross-sectional plan view showing the details of the split mold in its closed state, which is parted into two halves. A bottom parting line 117 is formed axisymmetrically around the center of the bottom surface 104 of the bottom 103 of the mold cavity 102. This bottom parting line 117 comprises a linear pinch-off line 114 to be formed by the pinch-off blades 106 that butt against each other, a pair of mold parting lines 113 to be formed by the mold parting face 111 and located on the right and left peripheries of the bottom surface 104, and a pair of connecting lines 116 that connect the right and left ends of the pinch-off line 114 to the inner ends of respective right and left mold parting lines 113.

In the first embodiment of this invention relating to a mold, the connecting lines 116 is kept in an inconspicuous state on the underside bottom surface of the container because the connecting lines 116 are formed along the arc of a circular bottom edge line 118, which is formed along the periphery of the bottom surface 104 when the bottom blocks 107 are fitted into, and combined with, the split mold.

The pinch-off line 114 passes the center of the bottom surface 104 of the round bottom 103. This line is formed in a direction that is inclined from the direction of the mold parting lines 113 at a given central angle, $\alpha$. The connecting lines 116 are formed from the end parting faces 112 located at the right and left ends of the mold pinch-off section 105. Right angle Bent corners 115 are formed at the right and left ends of the pinch-off line 114.

FIG. 23 includes explanatory diagrams, which are cross-sectional plan views showing the pinch-off process in which the split mold 101 in the first embodiment of this invention is employed. With progress in the mold clamping operation, the parison P is pinched and pressed flat by the mold pinch-off section 105, which is provided with the pinch-off blades 106. At that time, a barrier function is performed by the bent corners 115 formed at the right and left ends of the pinch-off line 114, or by the end parting faces 112 formed at the right and left ends of the mold pinch-off section 105. Therefore, it is possible to prevent resin from flowing over the mold parting face 111 in the lateral direction, as caused by the pressure of the pinch-off blades 106 that push the flat parison.

As found from FIGS. 22 and 23, the direction of the pinch-off blades 106 is inclined at a central angle, $\alpha$, from the mold parting face 111, which is perpendicular to the direction of outline arrows, in which direction the split mold 101 is clamped as shown by the outline arrows in FIG. 23(a). The pinch-off process is smoothly achieved at the central angle, $\alpha$, of up to 45 degrees.

The bent corners 115 are formed by the end parting faces 112, which have a step height, h, or facial width at least nearly twice as much as the wall thickness of the parison P. Thus, the resin can be definitely prevented from flowing in the lateral direction and reaching the mold parting face 111. (See FIG. 23(b).)

Meanwhile, as described above, FIG. 7 shows an example of conventional split mold. Like the split mold in the first embodiment of this invention, the conventional split mold is also used to mold a container having a cylindrical body with a blow ratio of 1.8. Such a conventional split mold 101 is parted into front and rear halves from the mold parting face 111, which is perpendicular to the mold-clamping direction (as shown by an outline arrow in FIG. 7). Pinch-off blades 106 are disposed along this mold parting face 111 to form the mold pinch-off section 105.

FIG. 8 includes explanatory diagrams, which are cross-sectional plan views showing the pinch-off process in which the split mold 101 of FIG. 7 is employed. Under the closed mold condition (See FIG. 8(c)), the pinch-off line 114 and the mold parting lines 113 are aligned on a straight line. After the parison is pressed flat in the pinch-off process, the resin flows in the lateral direction and into the interstice between the mold parting faces 111. Especially in a container with a small blow ratio, this resin flow leads to a flash line, or even though there is no flash line, may still give rise to a glossy spot or a color spot in the vicinity of the mold parting lines on the sidewall of the body right above the bottom.

Figure 24:
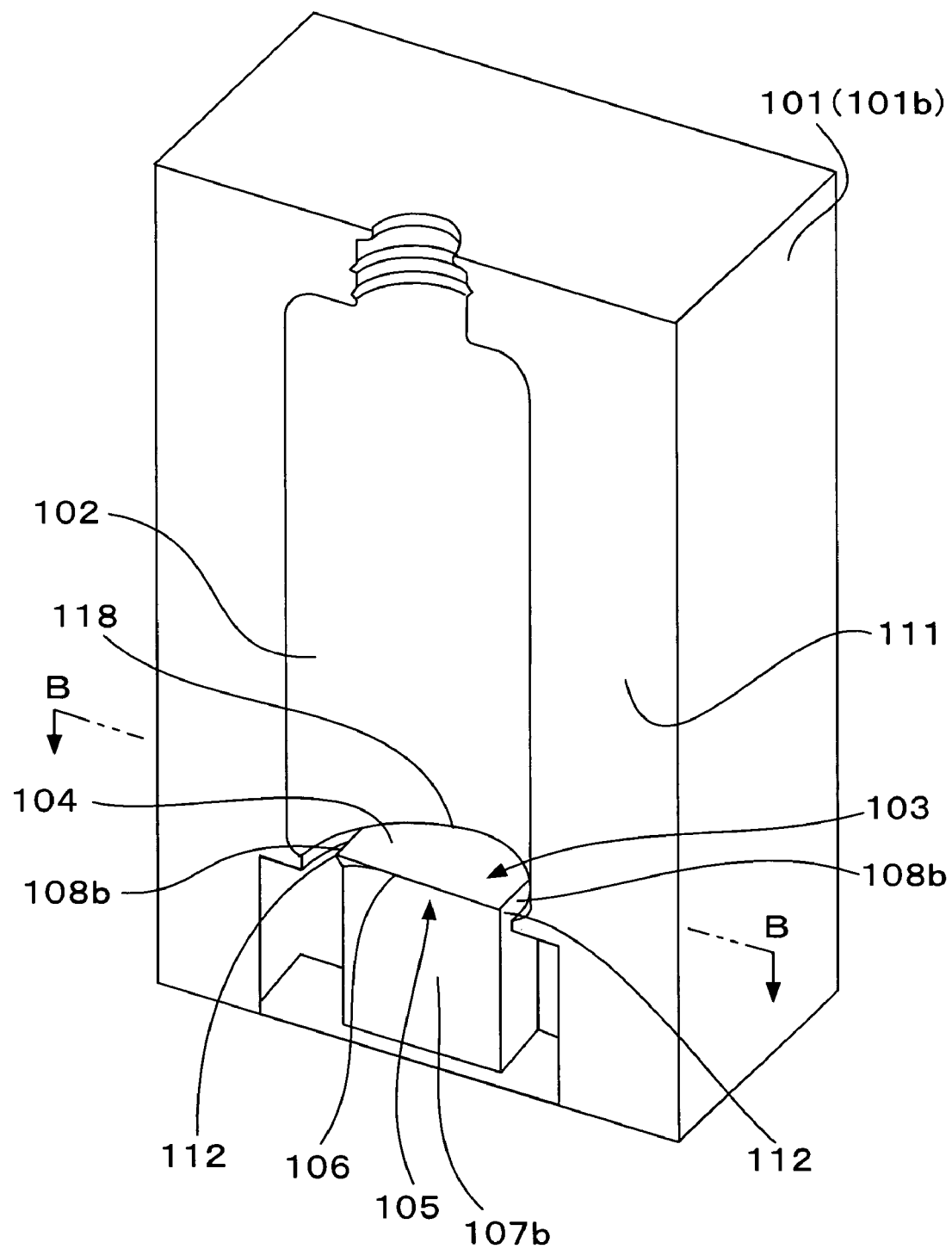
FIG. 24 is an entire perspective view showing the rear half of the split mold, for use in the blow molding, in the second embodiment of this invention relating to a mold.
Figure 25:
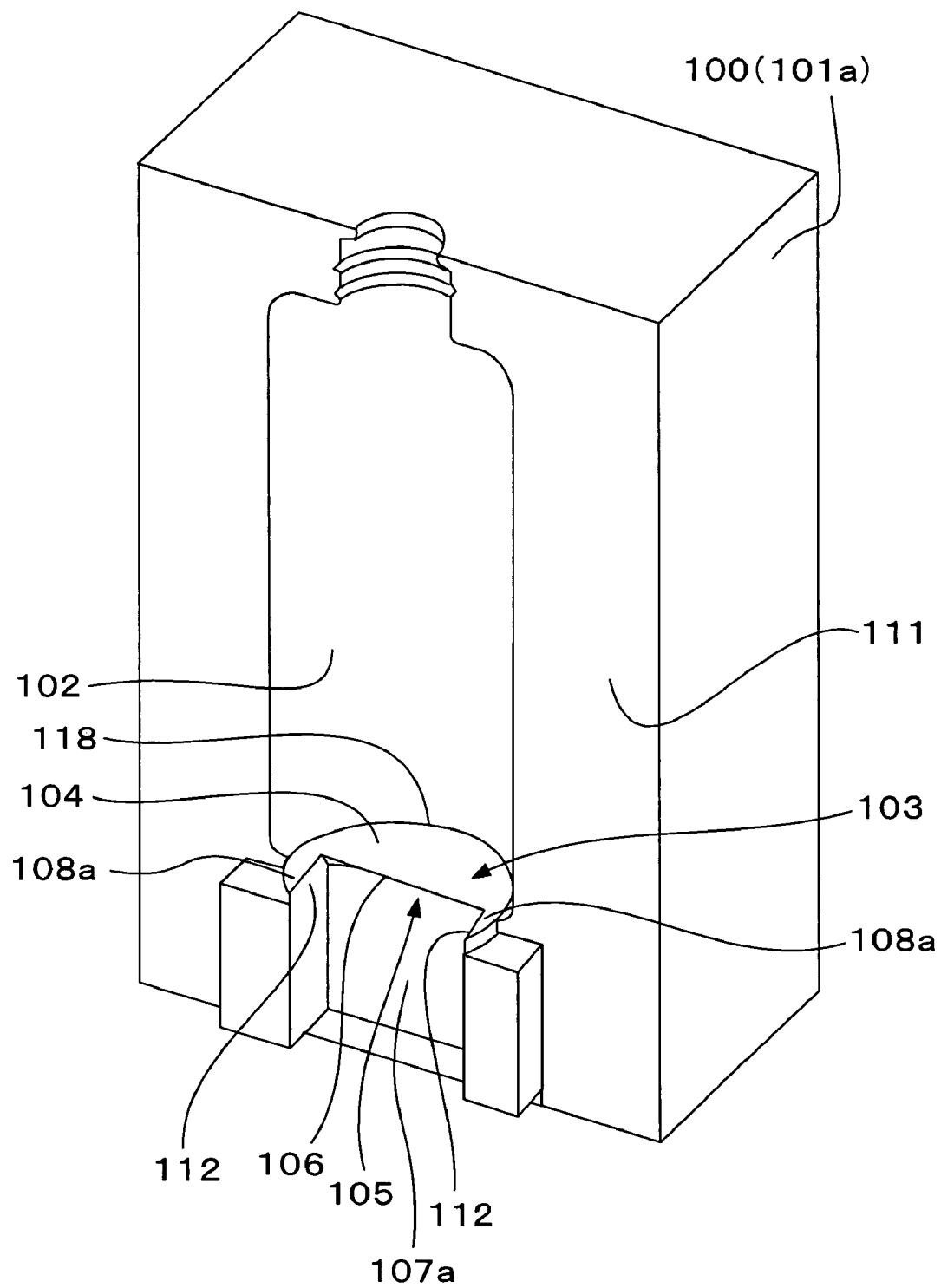
FIG. 25 is an entire perspective view showing the front half of the split mold, for use in the blow molding, in the second embodiment of this invention relating to a mold.

FIGS. 24-27 show the split mold 101 for use in blow molding in the second embodiment of this invention relating to a mold. FIGS. 24 and 25 are the entire perspective views of the rear half 101b and the front half 101a, the pair of separated halves of the split mold 101 for molding a container having a cylindrical body with a blow ratio of 2.

The split mold 101 in this second embodiment also comprises parting face with bent configuration in the portion under the bottom surface 104 of the bottom 103 of the mold cavity 102. The mold pinch-off section 105 is formed in the configuration that the pinch-off blades 106 are disposed in the direction along the mold parting face 111, i.e., in the same direction as in the conventional split mold.

End parting faces 112 are disposed at both ends of the mold pinch-off section 105 and roughly at right angles to the lateral direction of the pinch-off blades 106. As shown in FIGS. 24 and 25, a pair of recessions 108b and a pair of projections 108a, both in the shape of animal ears, partly include the end parting faces 112, and are disposed respectively in the rear and front mold halves, 101b and 101a, at both ends of the mold pinch-off section 105. Clamping of the split mold 101 is achieved when these projections 108a are fitted into the recessions 108b.

In the split mold for this embodiment, too, bottom blocks 107a and 107b, separately prepared aside from the split mold, are fitted as part of the mold that occupies the portion under the bottom surface 104 of the bottom 103 of the mold cavity 102.

Figure 26:
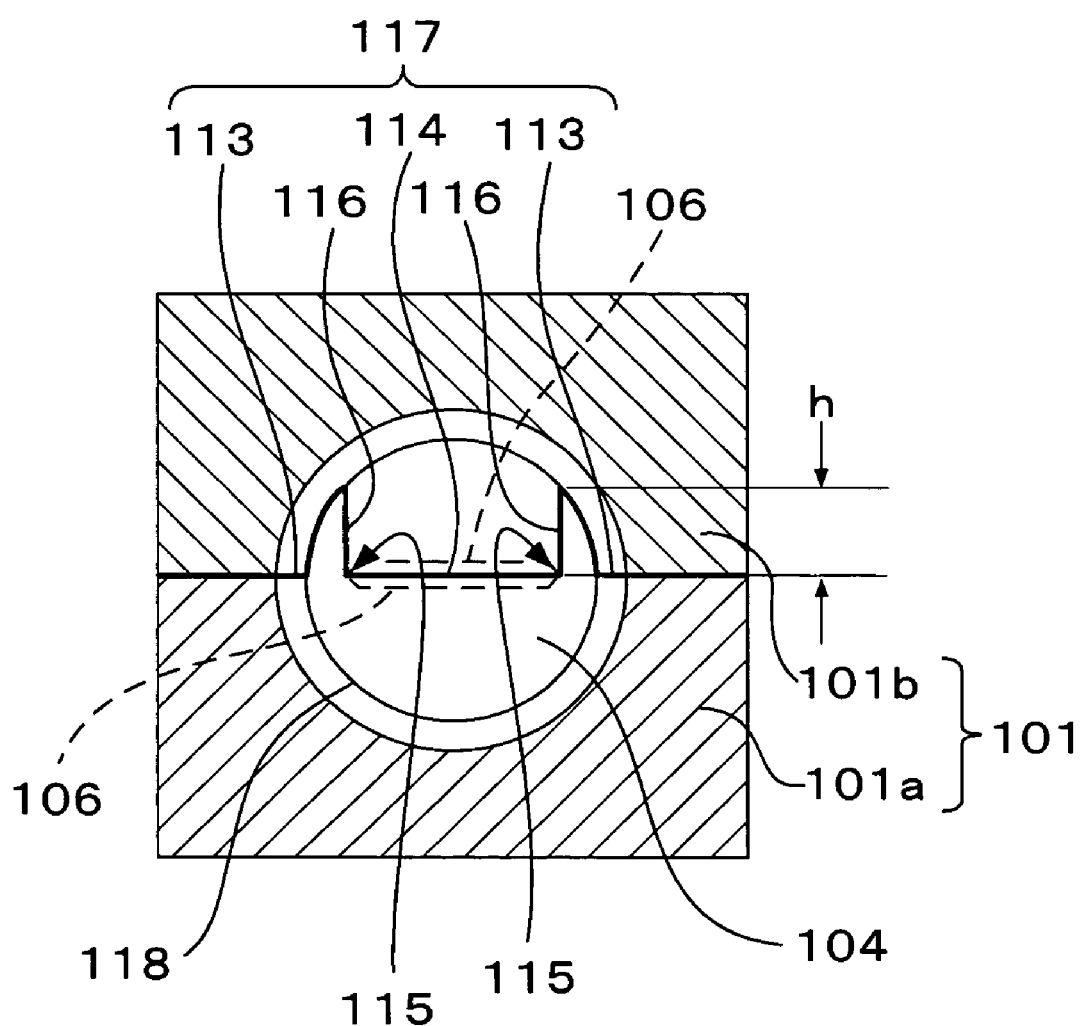
FIG. 26 is a cross-sectional plan view of the split mold halves of FIGS. 24 and 25 in their closed state, taken from line B-B of FIG. 24 in the direction indicated by arrows.

FIG. 26 is a cross-sectional plan view of the split mold 101 in the second embodiment of this invention relating to a mold, shown in the closed state. Based on this drawing, the split mold 101 is described in the details of splitting. A bottom parting line 117 is disposed symmetrically on the bottom surface 104 of the bottom 103 of the mold cavity 102, and comprises a linear pinch-off line 114, a pair of the mold parting lines 113, and a pair of connecting lines 116 in the shape of animal ears, which is formed by the fitting faces where the projection 108a comes in contact with the recession 108b, and which connect both ends of the mold pinch-off section 105 with the inner ends of the right and left mold parting lines 113.

The pinch-off line 114 is in the same direction as the mold parting lines 113. The connecting lines 116 form the right angle bent corners 115 with a step height, h, or facial width at the right and left ends of the pinch-off line 114. The length of the mold pinch-off section 105, i.e., the lateral length of the pinch-off line 114, is about 1.2 Dp, which is shorter than a flat parison width of 1.6 Dp, where Dp represents the outer diameter of parison P.

FIG. 27 comprises explanatory diagrams showing a pinch-off process using the split mold 101 in the second embodiment of this invention. The cylindrical parison P is pressed from both sides to turn into an oval shape. In a certain flat state, as shown in FIG. 27(b), a barrier function is fulfilled by the end parting faces 112, which are a part of the projections 108a having the shape of animal ears and serving for the front mold half 101a. Further lateral deformation of the resin is thus inhibited. Thereafter, the parison P is pressed flat within the range of the width of the right and left end parting faces 112. An extra amount of resin is forced to flow downward from under the pinch-off blades 106.

Inside the split mold 101 in the second embodiment of this invention, the parison P is pressed and flattened by the mold pinch-off section 105 on the face perpendicular to the clamping direction. The pinch-off process can be operated more smoothly than when the blades are inclined.

The above-described split molds, for use in the blow molding, in the first and second embodiments of this invention relating to a mold were described for the blowing of a container having a blow ratio of 1.8 or 2. But even if the mold pinch-off section 105 is less than 1.6 Dp in length, it is possible to control the deformation of the cylindrical parison P within the length of the mold pinch-off section 105 as long as the bent corners 115 have a full height, h. Thus, the mold of this invention for use in blow molding can also be used fully to mold a container having a blow ratio of 1.6 or less. Therefore, at a blow ratio in the range of 1 to 3, flash development during the blow molding can be restricted so as not to exceed the bent corners on the bottom surface of the mold cavity. A container can be provided, which has good appearances with no flash line, glossy spot, and/or color spot on the sidewall of the body.

INDUSTRIAL APPLICABILITY

This invention having the above-described configurations has the following effects:

The invention relates to a blow-molded container. In one embodiment, bent corners are inserted between the pinch-off line and the mold parting lines, which in the case of conventional containers, would be aligned with each other along a straight line on the underside bottom surface. Because of the bent corners according to this invention, it becomes possible for the flash development to be limited within the range from the center of the underside bottom surface to the bent corners. Therefore, a container can be provided, which has a low blow ratio and no flash line, glossy spot, or color spot on the sidewall of the body right above the bottom.

In another embodiment, the resin can be prevented from flowing in the lateral direction from both ends of the mold pinch-off section even though the flow is caused by the pinch-off blades that push the flattened resin. Therefore, flash can be restricted so as not to exceed the bent corners.

In another embodiment, it is possible to provide a container having a blow ratio of about 1.6 or less and no flash line, glossy spot, or color spot in the vicinity of the mold parting line on the sidewall of the body right above the bottom.

In another embodiment, the bent corners have a step height or facial width at least nearly twice as much as the wall thickness of the parison used in the blow molding. Especially at a blow ratio larger than about 1.6, the resin can be prevented from flowing in the lateral direction from both ends of the mold pinch-off section even though the flow is caused by the pinch-off blades that push the flattened resin.

In another embodiment, the pinch-off line is disposed so as to form a certain central angle with the direction of the mold parting lines, and bent corners can be formed at the right and left ends of the pinch-off line. The parting faces in the portion under the bottom surface of the split mold cavity can be formed in a simple shape. It becomes possible for the pinch-off line to be formed along the entire diameter of the underside bottom surface of the container. A container with a lower blow ratio than usual can be provided easily.

In another embodiment, a central angle, α, of 45 degrees or less ensures that the pinch-off process is achieved smoothly.

In another embodiment, the pinch-off line has the same direction as that of the mold parting lines and bent corners are formed in roughly symmetrical positions. In that case, the pinch-off process can be achieved more stably, and a fully large width or step height can be used for the end parting faces or the bent corners, thus ensuring that the deformation of the parison can be controlled in the lateral direction.

In another embodiment, the direct blow-molded product is used as the preform, and can be molded into a biaxially drawn, blow-molded container. It enables the preform to be molded in shapes not found in the injection-molded preform. The preform has various shapes, and provides a biaxially drawn, blow-molded container having uniform thickness and drawing magnification. If the parison is made of multi-layers, it is possible to manufacture a biaxially drawn, blow-molded container of the laminated type easily.

In another embodiment, the parison wall has a laminated structure. Thus, there can be easily obtained a container that can effectively demonstrate desired physical properties and characteristics.

In another embodiment, the molded container comprises a synthetic resin outer layer, which forms an outer envelope of a finite shape, and an inner layer of another synthetic resin, which forms an inner bag and is freely peelable from the outer layer. Such a container can be utilized as a delaminated container.

The invention also relates to a mold for use in blow molding. In one embodiment, end parting faces located at both ends of the mold pinch-off section control the lateral deformation of the parison, and carry out a barrier function to stop the lateral resin flow from both ends of the mold pinch-off section. As a result, a blow-molded container having a low blow ratio can be provided, which has good appearances and no flash line, glossy spot, or color spot in the vicinity of the mold parting lines on the body wall right above the bottom. This has been difficult with conventional molds.

Even for the container having a blow ratio of about 1.6 or less, the flash development can be restricted within the underside bottom surface of the container.

The faces performing the barrier function are formed by the configuration of the mold parting faces. There is no need to add another component or movable portion. Thus, the mold can have equivalent productivity and durability as compared to ordinary molds for use in blow molding.

In another embodiment, the bent corners have a step height or facial width at least nearly twice as much as the wall thickness of the parison used in the blow molding. Especially in the container having a blow ratio larger than about 1.6, the resin can be prevented from flowing in the lateral direction from both ends of the mold pinch-off section over into the interstices between opposite mold parting faces.

In another embodiment, parting faces are formed in such a simple shape that it has become possible for the mold pinch-off section to be formed along the entire diameter of the bottom surface. The mold can be used to mold containers with an unusually low blow ratio, and a mold can be provided, which has high durability, affords little residual resin, and allows for easy maintenance work.

In another embodiment, the pinch-off process can be fulfilled smoothly by setting the angle formed by the mold parting lines and the pinch-off line at 45 degrees or less.

In another embodiment, the parison is pressed flat by the mold pinch-off section on the face that is perpendicular to the direction in which the split mold is clamped. In that case, the pinch-off process can be achieved more stably than in the inclined case, and a fully large step height or facial width can be used for the bent corners or the end parting faces, thus ensuring that the deformation of the parison can be reliably controlled in the lateral direction.

The invention claimed is:

1. A blow-molded container comprising:
a cylindrical body;
a neck disposed in the upper portion of said body; and
a bottom disposed in the lower portion of said body, wherein
said container is formed by a direct blow molding process using a split mold, which has a mold parting face perpendicular to the mold-clamping direction and splits into front and rear mold halves, and in which a blow ratio in the range of 1 to 3 is set in the direction of mold parting lines formed by said mold parting face in a plan view showing a body portion above said bottom, wherein
each of said front and rear mold halves include a semi-columnar bottom block, said semi-columnar bottom block being disposed inside each of said respective front and rear mold halves and having a top surface, said top surface forming said bottom, said bottom and said cylindrical body forming a semi-circular bottom edge line, wherein
a bottom parting line is formed on an underside surface of said bottom by a linear pinch-off line, which is formed by pinch-off blades disposed at pinch-off section of said split mold, a pair of said mold parting lines formed on the right and left sides of a peripheral zone, and a pair of connecting lines that connect the right and left ends of said pinch-off line to inner ends of said right and left mold parting lines, wherein
said connecting lines adjacent to said pinch-off line are formed by end parting faces located at right and left ends of the pinch-off section of said split mold so that a pair of substantially right-angled bent corners is formed by said connecting lines and said pinch-off line and said pair of connecting lines formed along said semi-circular bottom edge line, wherein
said split mold forms flash lines on the underside surface of said bottom that extend only from the center of the underside surface to said bent corners, wherein
the pinch-off line linearly extends across a diameter and passes the center of the underside surface of the bottom, the pinch-off line being angularly offset by an angle α from the direction of the mold parting lines, wherein
the connecting lines are formed by connecting substantially linearly the right and left ends of said pinch-off line with the inner ends of respective right and left mold parting lines, the connecting lines being substantially perpendicular to the mold parting lines, and wherein
the bottom parting line is formed substantially axisymmetrically around the center of said underside surface.

2. The blow-molded container of claim 1, wherein a blow ratio larger than 1.6 is set.

3. The blow-molded container of claim 1, wherein a blow ratio of 1.6 or less is set.

4. The blow-molded container of claim 1, wherein said bent corners have a step height or facial width at least nearly twice the wall thickness of a parison used for blow molding.

5. The blow-molded container of claim 1, wherein said angle, α, is set at 45 degrees or less.

6. The blow-molded container of claim 1, said container used as a primary molded product and molded into a biaxially drawn, blow-molded container.

7. The blow-molded container of claim 1, wherein the container wall has a laminated structure.

8. The blow-molded container of claim 7, wherein the laminated structure comprises at least an outer layer made of a synthetic resin and an inner layer made of another synthetic resin having low compatibility with the synthetic resin of which the outer layer is made.

9. A mold for blow molding a container including a cylindrical body, a neck disposed in an upper portion of the body, and a bottom disposed in a lower portion of the body, the mold comprising:
a split mold having a mold parting face perpendicular to the mold-clamping direction, said split mold split into front and rear mold halves, wherein each of said front and rear mold halves include a semi-columnar bottom block, said semi-columnar bottom block being disposed inside each of said respective front and rear mold halves and having a top surface, said top surface forming said bottom disposed in said lower portion of said cylindrical body, said bottom and said cylindrical body forming a semi-circular bottom edge line; and
a mold pinch-off section to pinch off a parison and provided with pinch-off blades on a bottom surface of a bottom of a mold cavity, wherein
a bottom parting line is formed on the bottom surface of said split mold in its closed state, by a linear pinch-off line formed by the pinch-off blades,
a pair of mold parting lines formed by said mold parting face on the right and left peripheries, and
a pair of connecting lines that connect right and left ends of said pinch-off line to inner ends of said right and left mold parting lines, the pair of connecting lines formed along said semi-circular bottom edge line, wherein
said connecting lines adjacent to said pinch-off line are formed by end parting faces located at right and left ends of the pinch-off section of said split mold so that a pair of substantially right-angled bent corners is formed by said connecting lines and said pinch-off line, wherein
the pinch-off line linearly extends across a diameter and passes the center of the bottom surface of the bottom of the mold cavity, the pinch-off line being angularly offset by an angle α with the direction of the mold parting lines of said split mold in its closed state, wherein
the connecting lines are formed by connecting substantially linearly the right and left ends of said pinch-off line with the inner ends of respective right and left mold parting lines, the connecting lines being substantially perpendicular to the mold parting lines, and wherein
the bottom parting line is formed substantially axisymmetrically around the center of said bottom surface.

10. The mold of claim 9, wherein said bent corners have a step height or facial width at least nearly twice the wall thickness of the parison used for blow molding.

11. The mold of claim 9, wherein said angle, α, is set at 45 degrees or less.

* * * * *

UNITED STATES PATENT AND TRADEMARK OFFICE
CERTIFICATE OF CORRECTION

| | | |
|---|---|---|
| PATENT NO. | : 7,753,221 B2 | Page 1 of 1 |
| APPLICATION NO. | : 10/528660 | |
| DATED | : July 13, 2010 | |
| INVENTOR(S) | : Hiroaki Tokuda et al. | |

It is certified that error appears in the above-identified patent and that said Letters Patent is hereby corrected as shown below:

<u>Column 7,</u>
Line 33, change "corners have has" to --corners have--.

<u>Column 17,</u>
Line 19, change "angle Bent" to --angle bent--.

Signed and Sealed this
Third Day of May, 2011

David J. Kappos
*Director of the United States Patent and Trademark Office*